United States Patent
Ikemoto et al.

(10) Patent No.: US 12,469,241 B2
(45) Date of Patent: Nov. 11, 2025

(54) IMAGE PROCESSING APPARATUS, IMAGE PROCESSING METHOD, RECORDING MEDIUM, AND IMAGE PROCESSING SYSTEM, WITH CHANGE INSTRUCTION TO CHANGE FORM OF 3D DATA

(71) Applicant: CANON KABUSHIKI KAISHA, Tokyo (JP)

(72) Inventors: Kiyokatsu Ikemoto, Kanagawa (JP); Yosuke Eguchi, Tokyo (JP); Takuya Ishibashi, Tokyo (JP); Shingo Mori, Kanagawa (JP); Kanji Suzuki, Saitama (JP); Masahiro Tsujibayashi, Chiba (JP); Taisei Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 18/340,292

(22) Filed: Jun. 23, 2023

(65) Prior Publication Data
US 2024/0013499 A1 Jan. 11, 2024

(30) Foreign Application Priority Data
Jul. 8, 2022 (JP) .................. 2022-110590

(51) Int. Cl.
*G06T 19/20* (2011.01)
*G06V 10/54* (2022.01)
*G06V 40/18* (2022.01)

(52) U.S. Cl.
CPC .............. *G06T 19/20* (2013.01); *G06V 10/54* (2022.01); *G06V 40/193* (2022.01); *G06T 2219/2016* (2013.01)

(58) Field of Classification Search
CPC ............. G06T 19/20; G06T 2219/2016; G06T 2219/2021; G06T 13/40; G06V 10/54; G06V 40/193
See application file for complete search history.

(56) References Cited

U.S. PATENT DOCUMENTS

| | | | |
|---|---|---|---|
| 8,817,168 B2 | 8/2014 | Ikemoto | |
| 11,010,951 B1 * | 5/2021 | Schwartz | G06F 3/012 |
| 11,282,275 B1 * | 3/2022 | Park | G06T 15/04 |
| 2016/0104309 A1 * | 4/2016 | Kim | G06T 17/20 |
| | | | 382/118 |
| 2018/0336715 A1 * | 11/2018 | Rickwald | G06F 3/012 |
| 2020/0312002 A1 * | 10/2020 | Comploi | G06V 40/172 |
| 2021/0110511 A1 * | 4/2021 | Huang | G06T 19/20 |
| 2022/0358667 A1 | 11/2022 | Tsubaki | |
| 2022/0392155 A1 | 12/2022 | Ishibashi | |
| 2023/0206531 A1 * | 6/2023 | Agura | G06T 11/001 |
| | | | 345/473 |

FOREIGN PATENT DOCUMENTS

| | | | | |
|---|---|---|---|---|
| JP | 2022-076733 A | | 5/2022 | |
| KR | 2012102275 A | * | 9/2012 | G06F 15/16 |
| WO | WO-2023127870 A1 | * | 7/2023 | |

* cited by examiner

*Primary Examiner* — Maurice L. McDowell, Jr.
(74) *Attorney, Agent, or Firm* — Venable LLP

(57) ABSTRACT

An image processing apparatus generates an image pertaining to a subject. The apparatus obtains a captured image and asperity information of the subject; generates 3D data of the subject based on the captured image and the asperity information obtained; makes a change instruction to change a form of the 3D data generated; and generates, as the image pertaining to the subject, an image corresponding to the 3D data changed based on the change instruction.

27 Claims, 14 Drawing Sheets

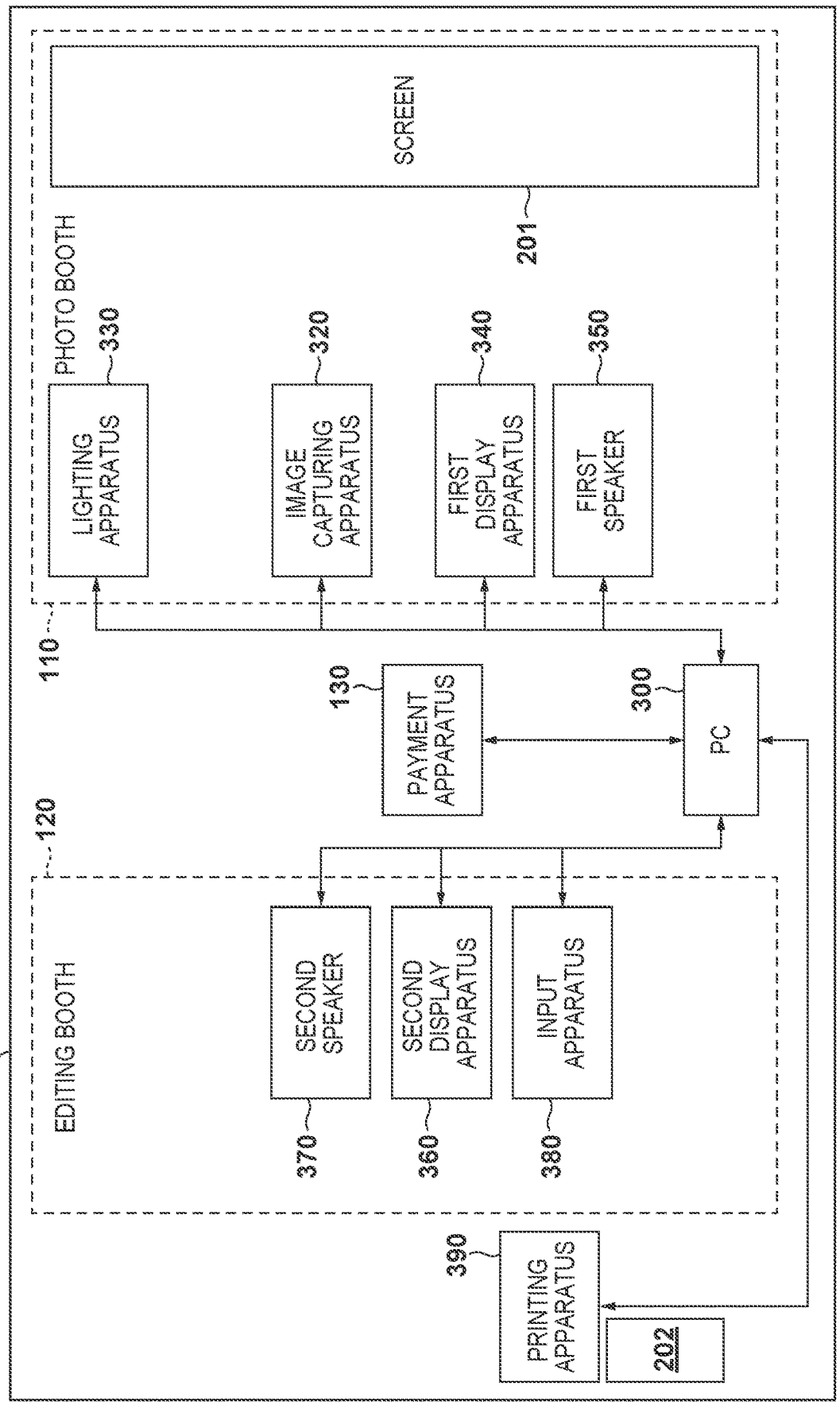

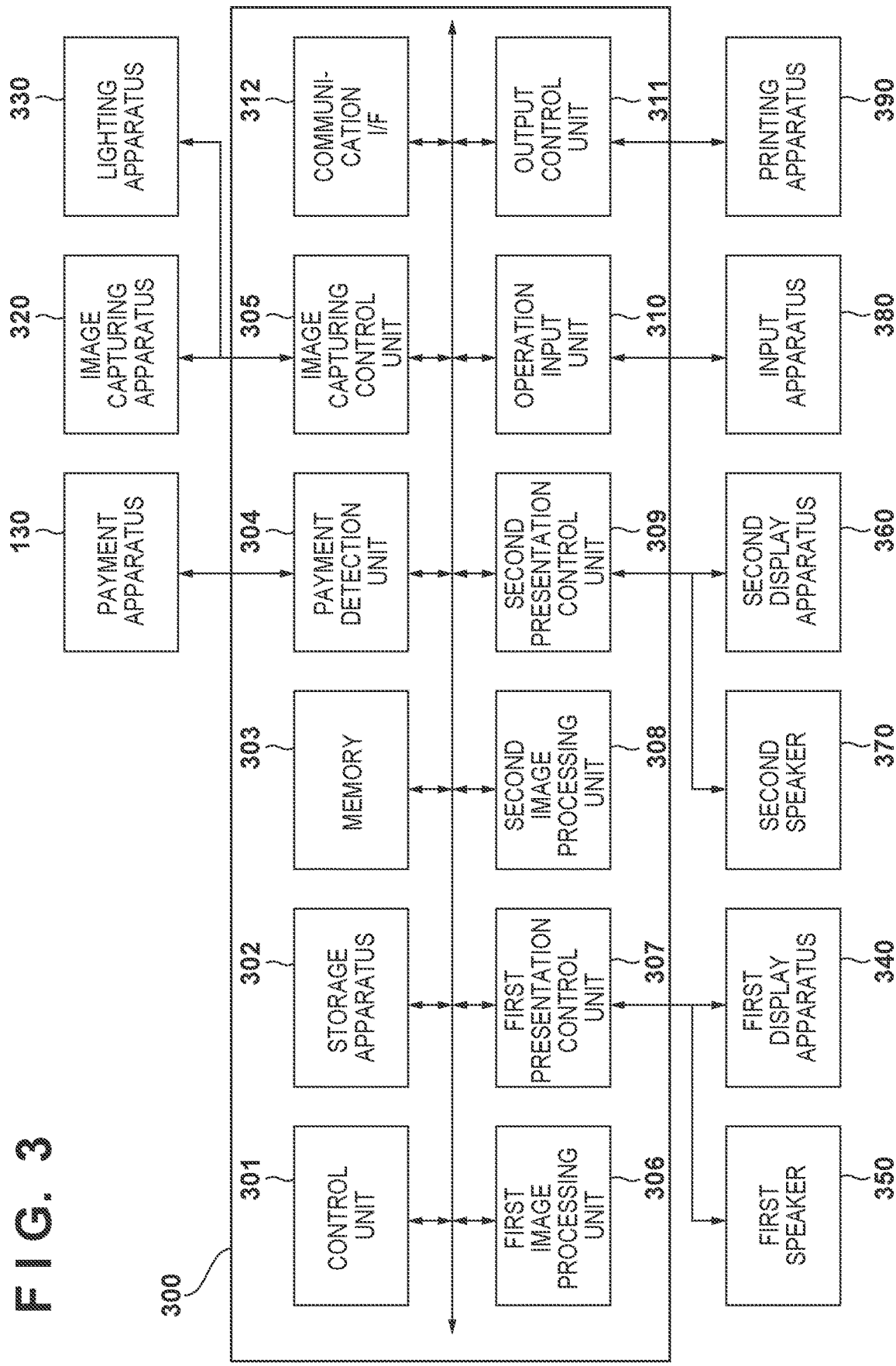

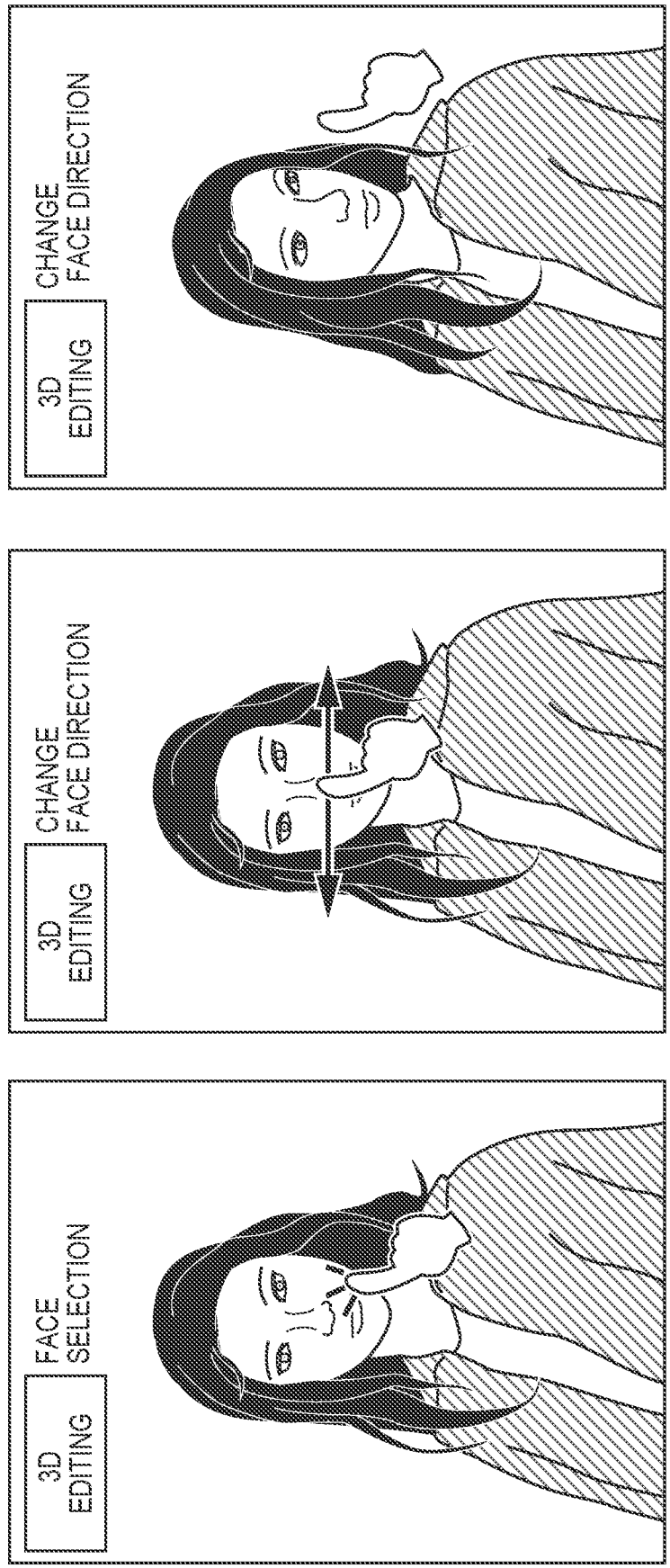

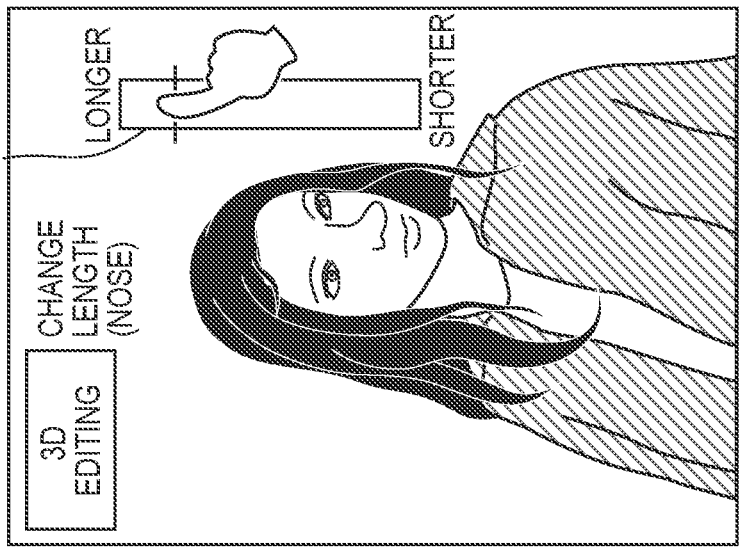
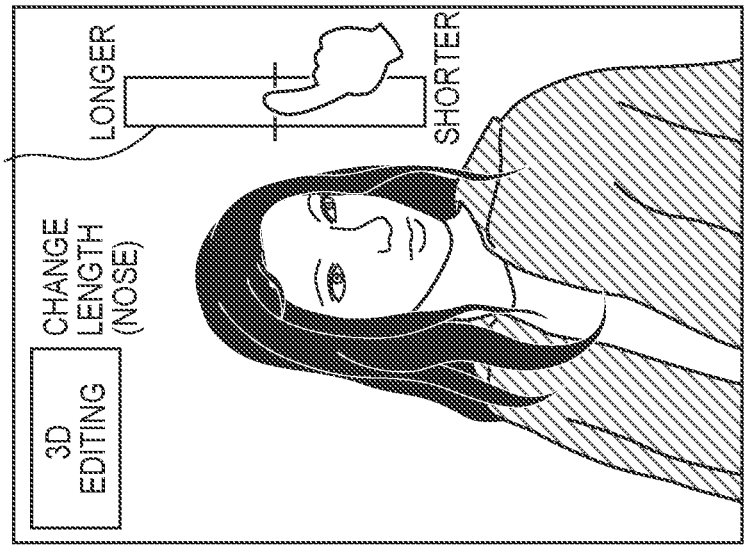
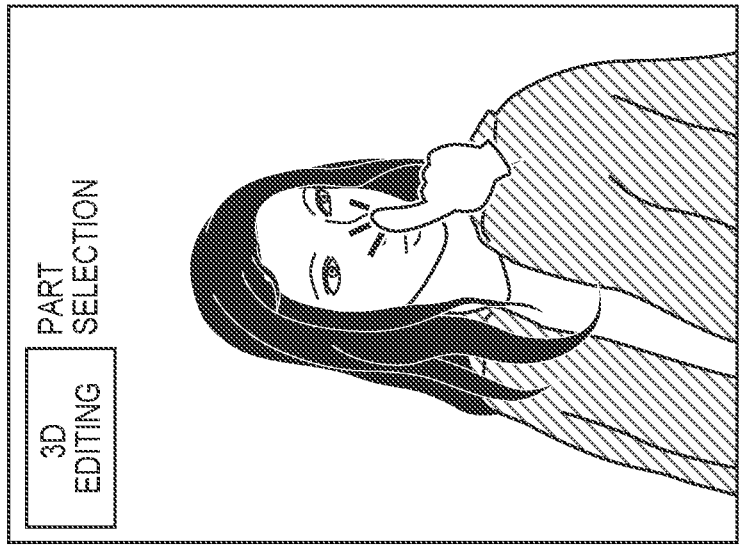

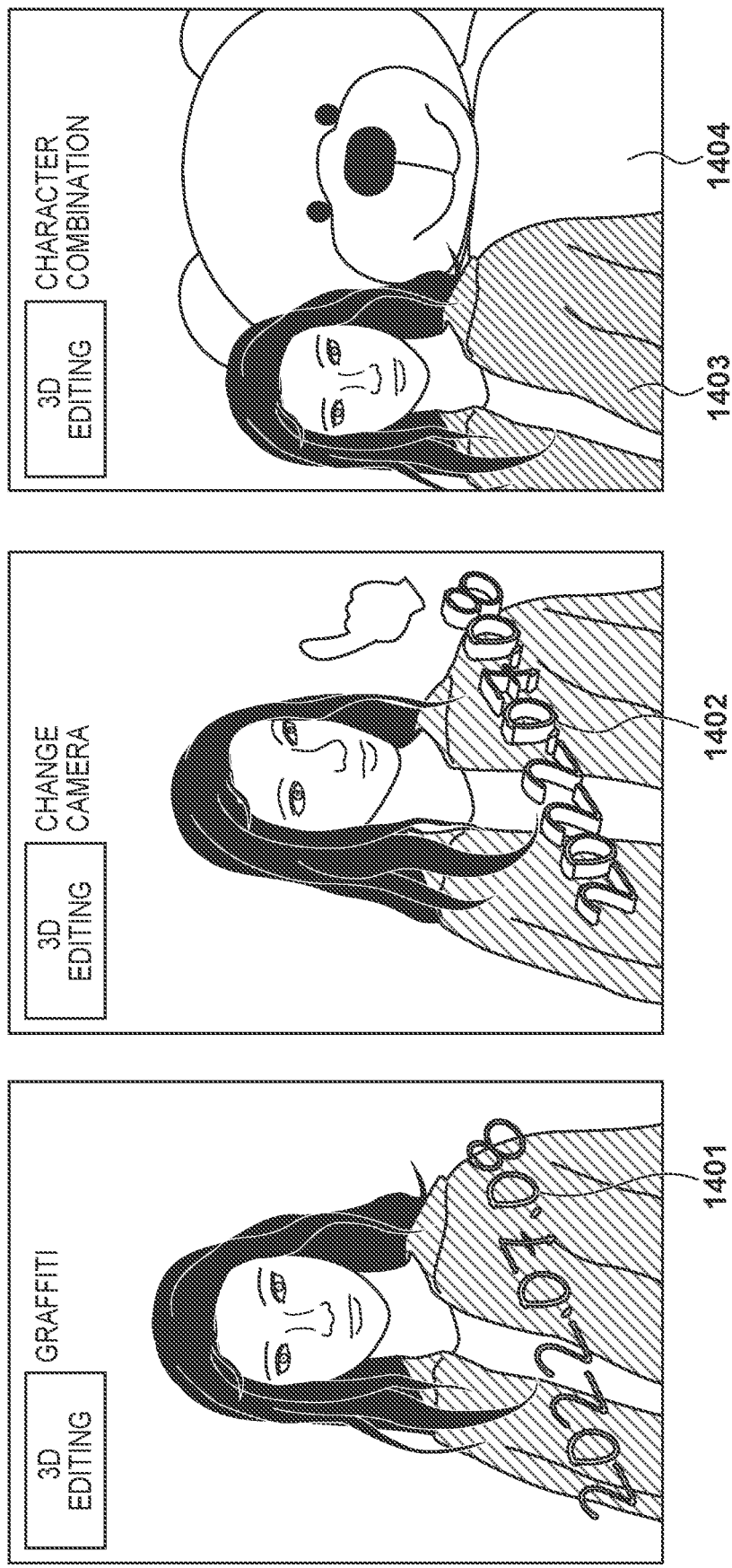

though these values are shown in FIGS. 6A and 6B for explanatory purposes.

IMAGE PROCESSING APPARATUS, IMAGE PROCESSING METHOD, RECORDING MEDIUM, AND IMAGE PROCESSING SYSTEM, WITH CHANGE INSTRUCTION TO CHANGE FORM OF 3D DATA

BACKGROUND OF THE INVENTION

Field of the Invention

The present invention relates to an image processing apparatus, an image processing method, a recording medium, and an image processing system, and particularly relates to an apparatus that prints and outputs a captured image.

Description of the Related Art

There is what is known as a photo sticker apparatus that shoots a subject (a user) and outputs, as a sticker, the captured image which the user has retouched or processed as desired (Japanese Patent Laid-Open No. 2022-076733).

Incidentally, processing that can be applied by a conventional apparatus such as that described in Japanese Patent Laid-Open No. 2022-076733 is limited to image processing in which the way the captured image is expressed is changed in two dimensions, e.g., adjusting the sizes of the eyes, contours, or the like of the subject. In other words, the image of the subject serving as the basis of the processing is limited to a 2D image expressed by the captured image, and thus it has been necessary for the subject to appear clearly in order for the user to obtain the desired output. For example, for the user to obtain a sticker in the desired state, it has been necessary to use the apparatus repeatedly or to re-take shots again until the proper pose, facial expression, and the like is captured.

SUMMARY OF THE INVENTION

Having been achieved in light of the aforementioned problem, the present invention provides an image processing apparatus, an image processing method, a recording medium, and an image processing system that make it easier for a user to obtain an output in a desired state.

The present invention in its first aspect provides an image processing apparatus that generates an image pertaining to a subject, the image processing apparatus comprising: at least one processor and/or circuit configured to function as the following units: an obtainment unit configured to obtain a captured image and asperity information of the subject; a first generation unit configured to generate 3D data of the subject based on the captured image and the asperity information obtained by the obtainment unit; an instruction unit configured to make a change instruction to change a form of the 3D data generated by the first generation unit; and a second generation unit configured to generate, as the image pertaining to the subject, an image corresponding to the 3D data changed based on the change instruction.

The present invention in its second aspect provides an image processing method for generating an image pertaining to a subject, the image processing method comprising: obtaining a captured image and asperity information of the subject; generating 3D data of the subject based on the captured image and the asperity information obtained; making a change instruction to change a form of the 3D data generated; and generating, as the image pertaining to the subject, an image corresponding to the 3D data changed based on the change instruction.

The present invention in its third aspect provides a computer-readable recording medium having stored therein a program for causing a computer to function as the respective units of the image processing apparatus according to the first aspect.

The present invention in its fourth aspect provides an image processing system comprising an image capturing apparatus and an image processing apparatus that generates an image of a subject from the image capturing apparatus, wherein the image capturing apparatus includes: an image capturing unit configured to obtain a captured image of the subject; and a measurement unit configured to obtain asperity information of the subject, and the image processing apparatus includes at least one processor and/or circuit configured to function as the following units: an obtainment unit configured to obtain the captured image and the asperity information of the subject from the image capturing apparatus; a first generation unit configured to generate 3D data of the subject based on the captured image and the asperity information obtained by the obtainment unit; an instruction unit configured to make a change instruction to change a form of the 3D data generated by the first generation unit; and a second generation unit configured to generate, as the image pertaining to the subject, an image corresponding to the 3D data changed based on the change instruction.

Further features of the present invention will become apparent from the following description of exemplary embodiments (with reference to the attached drawings).

BRIEF DESCRIPTION OF THE DRAWINGS

FIG. 2 is a diagram illustrating an example of the hardware configuration of the photo sticker apparatus 100 according to the embodiments and variations of the present invention.

FIG. 3 is a block diagram illustrating an example of the functional configuration of a PC 300 according to the embodiments and variations of the present invention.

FIGS. 11A, 11B, and 11C are diagrams illustrating a 3D editing function of the photo sticker apparatus 100 according to a second embodiment of the present invention.

FIGS. 13A, 13B, and 13C are diagrams illustrating a 3D editing function of the photo sticker apparatus 100 according to a third embodiment of the present invention.

FIGS. 14A, 14B, and 14C are diagrams illustrating a 3D editing function of the photo sticker apparatus 100 according to a sixth variation of the present invention.

DESCRIPTION OF THE EMBODIMENTS

First Embodiment

Figure 1A:
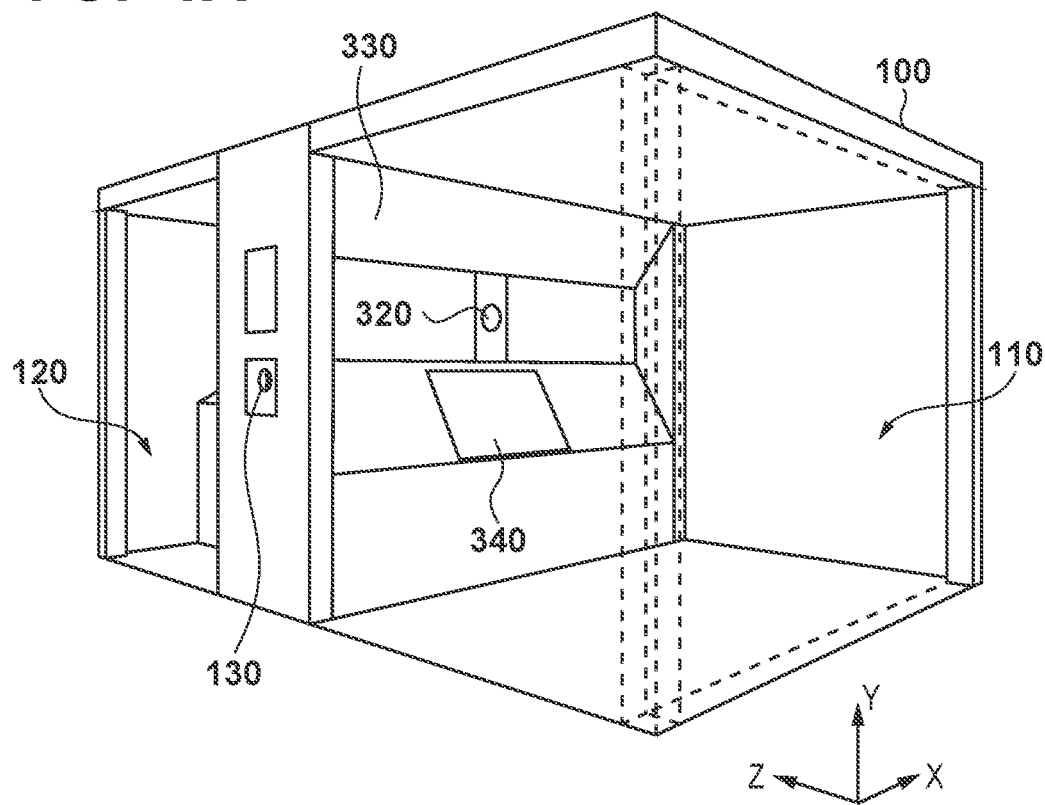
FIGS. 1A and 1B are diagrams illustrating an example of the external configuration of a photo sticker apparatus 100 according to embodiments and variations of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The following embodiment will describe an example in which the present invention is applied in a photo sticker apparatus, serving as an example of an image processing system, which is capable of outputting a sticker on which an image of a subject is printed. However, the present invention can be applied in any device that is capable of generating an image of a subject.

Configuration of Photo Sticker Apparatus

Figure 1B:
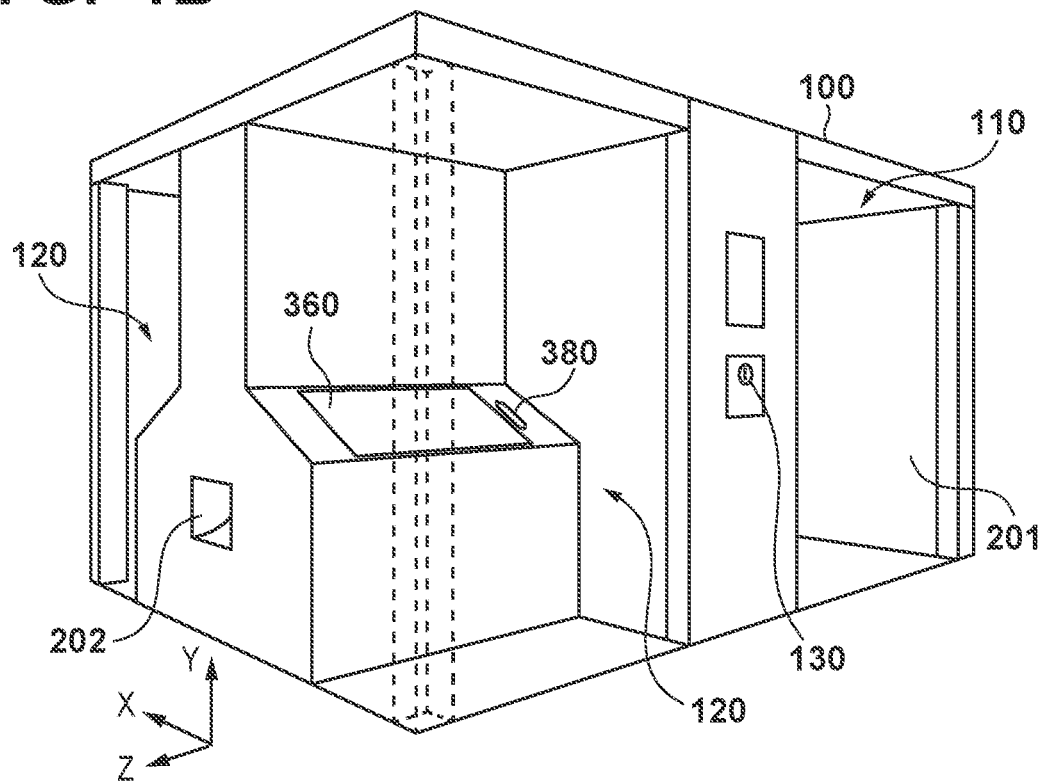

FIGS. 1A and 1B are diagrams illustrating the external configuration of a photo sticker apparatus 100 according to the present embodiment, and FIG. 2 is a schematic diagram illustrating the hardware configuration of the photo sticker apparatus 100.

Although details will be given later, the photo sticker apparatus 100 is a unit that provides a service for shooting an image of a subject, accepting editing operations such as retouching and the like on the resulting image, and outputting a sticker on which the image generated after the editing has been printed. In other words, a user of the photo sticker apparatus 100 can be provided with a service by paying a fee, and in this service, the user can obtain a sticker on which an image, obtained by taking a shot of him/herself and on which desired edits have then been made to the shot image, has been printed.

FIGS. 1A and 1B illustrate the appearance of the photo sticker apparatus 100 viewed from different directions (a photo booth 110 side and an editing booth 120 side). As illustrated in the drawings, the photo sticker apparatus 100 includes a photo booth 110 for shooting an image of a user, who is the subject, and an editing booth 120 that provides editing functions for the image obtained from the shooting. Normally, the photo sticker apparatus 100 is provided with curtains, partitions, and the like to hide the state of the image being shot or edited, but in the example illustrated in FIGS. 1A and 1B, parts thereof are not shown to make the external configuration clearly visible.

As illustrated in the schematic diagram in FIG. 2, the photo booth 110 includes hardware configurations for shooting images, such as an image capturing apparatus 320, a lighting apparatus 330, a first display apparatus 340 for confirming one's appearance, a first speaker 350 for outputting guidance audio for the shooting, a screen 201, and the like. The photo sticker apparatus 100 of the present embodiment is assumed to be provided with a single image capturing apparatus 320. The screen 201 is a component that makes it easy to extract a region of the subject during editing, and is constituted by a material having a set, uniform color, such as green or blue, for example.

Meanwhile, the editing booth 120 includes a second display apparatus 360 and a second speaker 370 that present information pertaining to editing (display and audio output), and an input apparatus 380 that accepts operation inputs pertaining to editing. A printing apparatus 390 is provided on the side of the editing booth 120, and outputs a sticker on which the edited image is printed. In the photo sticker apparatus 100 of the present embodiment, the sticker output by the printing apparatus 390 is guided to a provision port 202 through a predetermined guide, and can be retrieved by the user.

Outside these booths, a payment apparatus 130 is provided in an outer wall of the photo sticker apparatus 100, which accepts the payment of a fee for using the photo sticker apparatus 100. In one aspect, the payment apparatus 130 has an insertion port for a specific type of coin, and detects the insertion of coins having a predetermined value to output a signal serving as a trigger to start providing a service. In another aspect, the payment apparatus 130 may be configured such that the fee can be paid using a cashless method such as electronic money, and, for example, detects the completion of payment processing performed through communication with a chip provided in a communication terminal or the like to output the signal serving as a trigger. Although not an element involved in carrying out the present invention, the payment apparatus 130 may accept payment of a fee for making a reservation for the service. In this case, information pertaining to the reservation is displayed in a display apparatus provided in the periphery of the payment apparatus 130.

The photo sticker apparatus 100 also includes a PC 300 that controls the hardware. Although the present embodiment will describe one PC 300 as controlling the shooting in the photo booth 110, the provision of the editing functions in the editing booth 120, and the print output from the printing apparatus 390, the present invention is not limited thereto. In other words, the hardware in each booth may be controlled by a plurality of apparatuses configured to be capable of working in tandem.

Functional Configuration of PC

The functional configuration of the PC 300 as an image processing apparatus in the photo sticker apparatus 100 of the present embodiment will be described in detail next with reference to the block diagram in FIG. 3.

A control unit 301 is a control apparatus such as a CPU, and controls the operations of the respective blocks of the PC 300. Specifically, the control unit 301 controls the operations of respective blocks by reading out operation programs for those blocks, application programs for providing services, and the like stored in a storage apparatus 302, loading the programs into a memory 303, and executing the programs, for example.

The storage apparatus 302 is, for example, a storage apparatus capable of permanent information storage, such as an HDD or non-volatile memory. In addition to the operation programs and application programs for the blocks, the storage apparatus 302 stores parameters necessary for the blocks to operate, effects that can be used for image editing, image elements such as stamps added to (superimposed on) the image during editing, and the like. The memory 303 is a storage apparatus such as a volatile memory or the like used for a work area, temporary information storage, or the like. The memory 303 is used not only as a region for loading the operation programs, application programs, and the like, but also as a storage region for data outputted in the operations of the blocks, various types of data required for the operations of the blocks, and the like.

A payment detection unit 304 detects that a payment of a fee for using the photo sticker apparatus 100 has been made. The payment detection unit 304 makes the detection based on the signal output from the payment apparatus 130.

An image capturing control unit 305 controls the operations of the image capturing apparatus 320. Although details will be given later, for example, while an application for providing the service is being executed, the image capturing control unit 305 causes the image capturing apparatus 320 to perform image capturing operations, and obtains captured images in sequence. When it is time to shoot an image, the image capturing control unit 305 outputs an image obtained from shooting processing as well as asperity information (described later), which indicates the shape of the subject at the time of shooting. Hereinafter, an image obtained by performing shooting processing will be referred to simply as a "shot image" in order to distinguish that image from captured images obtained in sequence, but it goes without saying that a shot image is one form of a captured image. The image capturing control unit 305 also controls the lighting apparatus 330, which is a strobe or the like, as necessary during shooting to adjust the lighting state of the subject. Although the present embodiment describes the lighting apparatus 330 as being controlled by the PC 300, the present invention is not limited thereto, and the lighting apparatus 330 may instead be controlled by the image capturing apparatus 320.

A first image processing unit 306 applies predetermined image processing to the captured image obtained intermittently from the image capturing apparatus 320, and generates an image to be displayed in the first display apparatus 340 provided in the photo booth 110. The first display apparatus 340 is a display such as an LCD or the like, and by sequentially displaying the captured images (through-the-lens display), the user can confirm his/her appearance in the image being shot. The first display apparatus 340 may also display the shot image obtained from shooting for confirmation, in order to provide the user with the opportunity to retake the shot or the like.

A first presentation control unit 307 controls the presentation of information to a user present in the photo booth 110. In the present embodiment, the information is assumed to be presented by displaying a screen (image) and outputting audio, and the first presentation control unit 307 controls the display in the first display apparatus 340 and controls the output of audio to the first speaker 350.

A second image processing unit 308 generates an image, which is a screen pertaining to editing functions, to be displayed in the second display apparatus 360 provided in the editing booth 120. In the present embodiment, the image displayed in the second display apparatus 360 includes the shot image, an image obtained by applying predetermined processing for editing to that shot image, and the like, in order to provide the editing function for shot image. Although details will be given later, the predetermined processing pertaining to editing includes processing for generating 3D data of the subject based on the shot image and the asperity information, processing for changing the form of the 3D data, and processing for generating an image corresponding to the changed 3D data.

A second presentation control unit 309 controls the presentation of information to a user present in the editing booth 120. Like the first presentation control unit 307, the information is presented by displaying a screen and outputting audio, and the second presentation control unit 309 controls the display in the second display apparatus 360 and the audio output to the second speaker 370.

An operation input unit 310 detects an operation input made through the input apparatus 380, and outputs a corresponding control signal to the control unit 301. The input apparatus 380 is a user interface included in the PC 300, and in the photo sticker apparatus 100 of the present embodiment, includes a stylus pen provided in the editing booth 120. The operation input unit 310 detects handwriting operations made using the stylus pen on a display surface of the second display apparatus 360 or a top plate provided as an upper layer of the display surface, and outputs various types of information pertaining to the operation inputs as control signals. In addition, the input apparatus 380 includes a touch panel for detecting touch operations made on the second display apparatus 360. Although the present embodiment will describe the input apparatus 380 as mainly a user interface provided in the editing booth 120 and the operation input unit 310 as accepting operation inputs pertaining to editing, the present invention is not limited thereto. The input apparatus 380 may also include a user interface which is provided in the photo booth 110, such as a touch panel for detecting touch operations made on the first display apparatus 340 and which is provided to selecting a theme for shooting, for example.

An output control unit 311 controls the output of an image generated after the editing operations performed in the editing booth 120 (an output image). In the photo sticker apparatus 100 of the present embodiment, the output image is printed onto sticker paper and output, and thus the output control unit 311 transmits the output image, along with a print request, to the printing apparatus 390 to be printed.

A communication I/F 312 is an interface for making a communication connection to an external apparatus included in the PC 300. The PC 300 of the present embodiment is connected to the image capturing apparatus 320, the lighting apparatus 330, the first display apparatus 340, the first speaker 350, the second display apparatus 360, the second speaker 370, the input apparatus 380, and the printing apparatus 390. Accordingly, the communication I/F 312 includes an interface for making communication connections with various apparatuses. Furthermore, the communication I/F 312 may include interfaces not only for connecting to the various apparatuses provided in the photo sticker apparatus 100, but also for making communication connections with other apparatuses over a network such as the Internet, interfaces for making direct communication connections with other apparatuses through short-range wireless communication, and the like.

Functional Configuration of Image Capturing Apparatus

Figure 4:
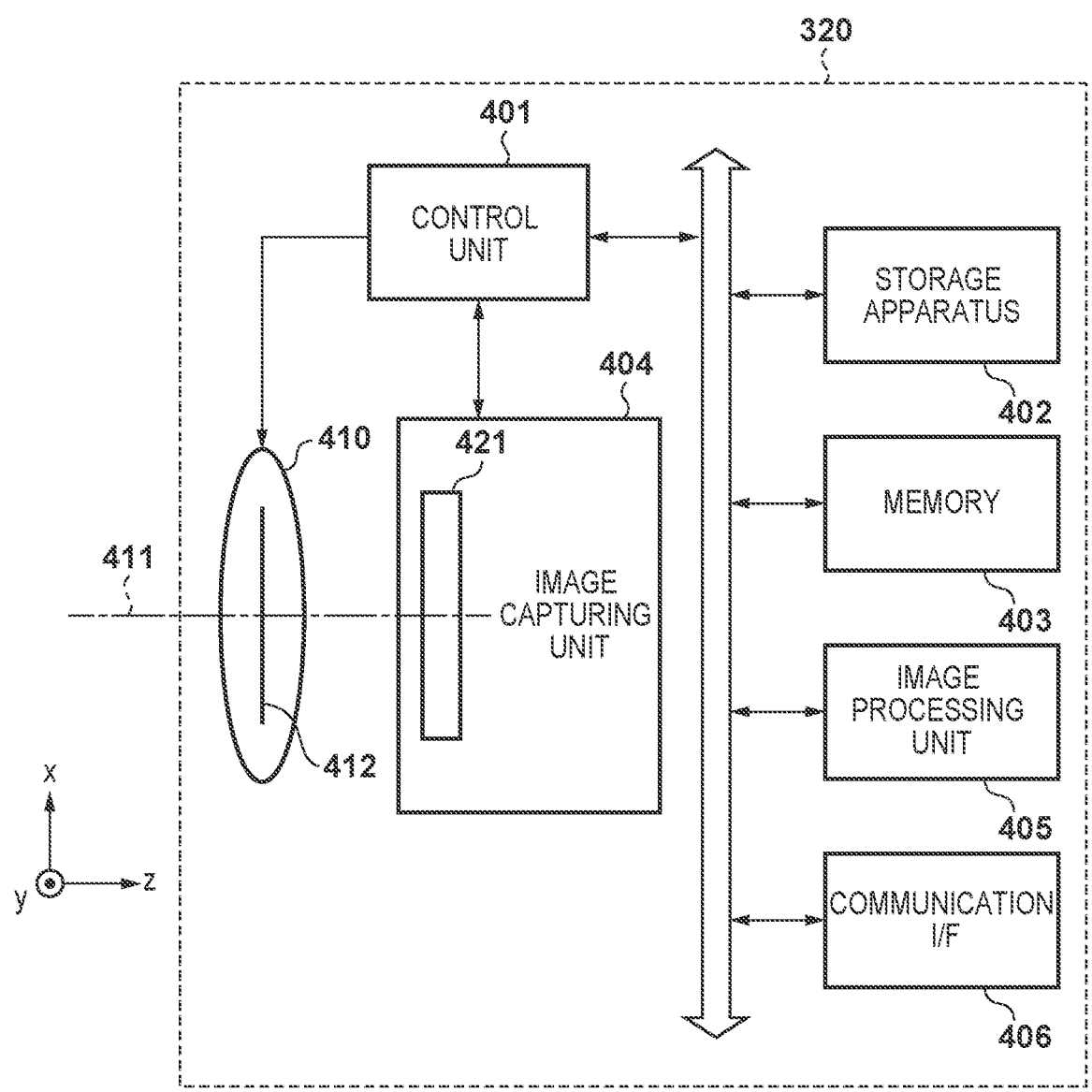
FIG. 4 is a block diagram illustrating an example of the functional configuration of an image capturing apparatus 320 according to the embodiments and variations of the present invention.

The functional configuration of the image capturing apparatus 320 will be described in detail next with reference to the block diagram in FIG. 4.

A control unit 401 is a control apparatus, such as a CPU, a microprocessor, or the like, that controls the operations of the blocks in the image capturing apparatus 320. To be more specific, the control unit 401 reads out operation programs for each of the blocks, stored in a storage apparatus 402, for example, loads the programs into a memory 403, and executes the programs to control the operations of those blocks.

The storage apparatus 402 is a non-volatile memory, for example, and stores parameters and the like necessary for the blocks to operate in addition to the operation programs of the blocks. Meanwhile, the memory 403 is a recording apparatus such as a volatile memory or the like used for a work area, temporary information storage, or the like. The memory 403 is used not only as a region for loading the operation programs, application programs, and the like, but also as a storage region for data outputted in the operations of the blocks, various types of data required for the operations of the blocks, and the like. The memory 403 is also assumed to store information of various settings of the image capturing apparatus 320 when capturing images (image capturing condition information), parameters pertaining to processing to be applied, and the like.

An image capturing unit 404 includes an image sensor 421 such as, for example, a CCD (charge-coupled device), a CMOS (complementary metal oxide semiconductor) sensor, or the like. The image capturing unit 404 photoelectrically converts an optical image formed on an image capturing plane of the image sensor 421 through an optical imaging system 410, and outputs an analog image signal. The output analog image signal is A/D-converted by an A/D conversion unit (not shown) and is output as a digital image signal.

Here, the optical imaging system 410 is an image capturing lens provided in the image capturing apparatus 320, and forms an optical image of a subject on the image capturing plane of the image sensor 421. The optical imaging system 410 may be constituted by a plurality of lenses (not shown) arranged on an optical axis 411, and includes an exit pupil 412 at a position a predetermined distance from the image sensor 421. Note that the present specification defines the direction parallel to the optical axis 411 as a z direction or a depth direction; the direction orthogonal to the optical axis 411 and parallel to the horizontal direction of the image sensor 421 as an x direction; and the direction parallel to the vertical direction of the image sensor 421 as the y direction; or such axes are provided.

In the present embodiment, the image capturing unit 404 also functions as a unit configured to obtain asperity information on the subject present in an image capturing range. Here, the asperity information is information indicating the 3D shape of the subject, but is assumed in the present embodiment to be 2D information holding a distance from the image capturing apparatus 320 to the subject (a subject distance) for each pixel in the captured image (also called a "depth image" or "distance information"). In order to obtain the asperity information in an image processing unit 405 (described later), the image sensor 421 is configured to be capable of obtaining an image group used for rangefinding through the imaging plane phase-difference detection rangefinding method.

Detailed Configuration of Image Sensor

Figure 5A:
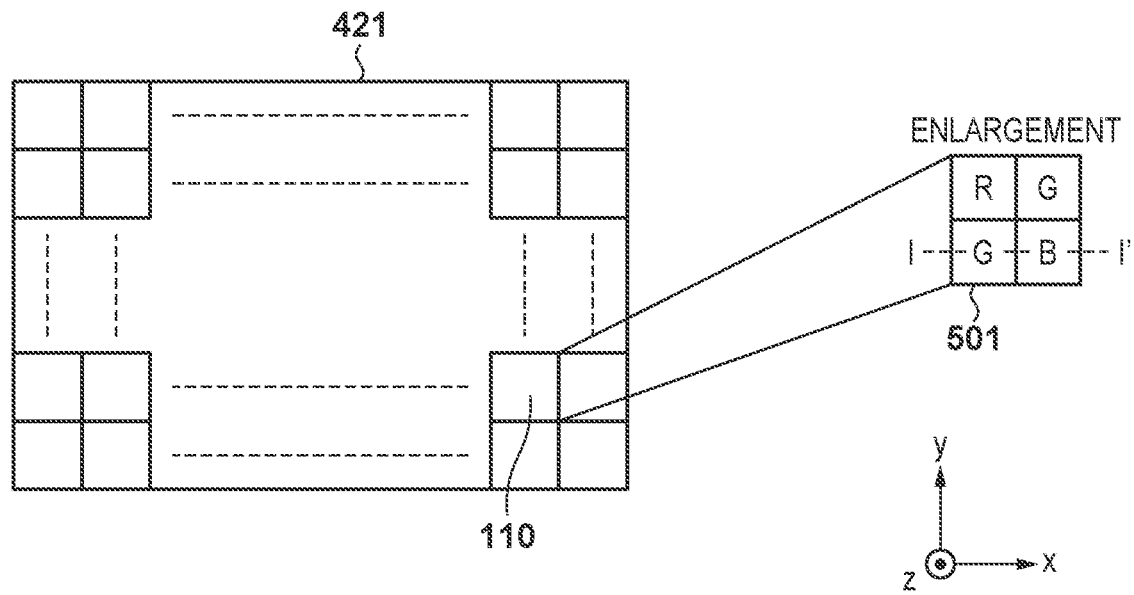
FIGS. 5A and 5B are diagrams illustrating the detailed configuration of an image sensor in the image capturing apparatus 320 according to the embodiments and variations of the present invention.
Figure 5B:
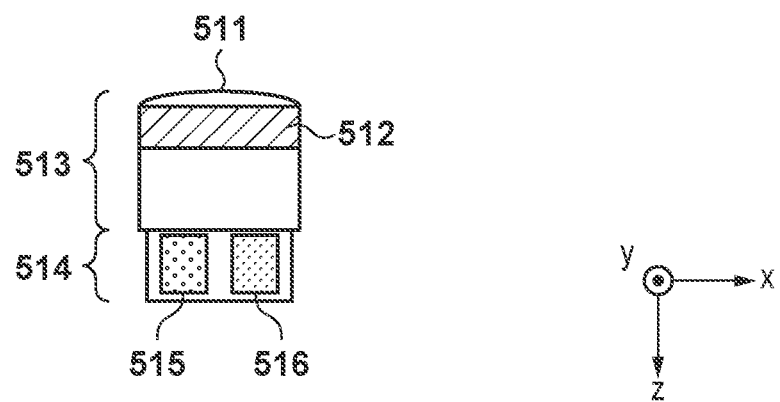

FIGS. 5A and 5B illustrate the configuration of the image sensor 421 in detail. As illustrated in FIG. 5A, the image sensor 421 is constituted by a plurality of pixel groups 501, each having two rows and two columns, to which different color filters have been applied, and which are connected in an array. As illustrated in the enlarged view, each pixel group 501 has red (R), green (G), and blue B color filters arranged, and an image signal indicating color information of either R, G, or B is output from each pixel (photoelectric conversion element). Although the present embodiment describes the color filters as being in a distributed pattern such as that illustrated, it is easy to understand that the present invention is not limited thereto.

To implement the imaging plane phase-difference detection rangefinding function of the image sensor 421 of the present embodiment, a single pixel (photoelectric conversion element) is constituted by a plurality of photoelectric conversion units arranged side by side in the I-I' cross-section of FIG. 5A, which follows the horizontal direction of the image sensor 421. As illustrated in FIG. each pixel in the image sensor 421 is constituted by a light guide layer 513 including a microlens 511 and a color filter 512, and a light receiving layer 514 including a first photoelectric conversion unit 515 and a second photoelectric conversion unit 516.

In the light guide layer 513, the microlens 511 is configured to efficiently guide light beams incident on a pixel to the first photoelectric conversion unit 515 and the second photoelectric conversion unit 516. The color filter 512 transmits light in a predetermined wavelength band, and transmits only light in one of the aforementioned R, G, or B wavelength bands, guiding that light to the first photoelectric conversion unit 515 and the second photoelectric conversion unit 516 in the later stages.

The light receiving layer 514 is provided with two photoelectric conversion units (the first photoelectric conversion unit 515 and the second photoelectric conversion unit 516), which convert the received light into analog image signals, and two types of signals output from these two photoelectric conversion units are used for rangefinding. In other words, each pixel of the image sensor 421 has two photoelectric conversion units arranged in the same horizontal direction, and an image signal constituted by the signals output from the first photoelectric conversion unit 515 of all the pixels, and an image signal constituted by the signals output from the second photoelectric conversion unit 516 of all the pixels, are used. In other words, the first photoelectric conversion unit 515 and the second photoelectric conversion unit 516 each partially receives the light beams incident on the pixels through the microlens 511. Accordingly, the set of image signals ultimately obtained is a pupil-divided image group pertaining to light beams that have passed through different pupil regions of the exit pupil of the optical imaging system 410. In other words, the image sensor 421 of the present embodiment is configured to be capable of capturing an image from light beams that have passed through different pupil regions of the optical imaging system 410 separate from each other. Here, a combination of the image signals obtained from the photoelectric conversion by the first photoelectric conversion unit 515 and the second photoelectric conversion unit 516 is equivalent to an image signal for viewing output from a single photoelectric conversion unit in a form in which only one photoelectric conversion unit is provided in the pixel.

Having such a structure makes it possible for the image sensor 421 of the present embodiment to output an image signal for viewing and an image signal for rangefinding (two types of pupil-divided images). Although the present embodiment describes all of the pixels in the image sensor 421 as having two photoelectric conversion units configured to be capable of outputting high-density depth information, the present invention is not limited thereto. For example, three or more photoelectric conversion units may be provided in each pixel, or pixels provided with a plurality of photoelectric conversion units may be limited to a part of the pixel group 501.

The image processing unit 405 applies various types of image processing to the captured image obtained by the image capturing unit 404. The image processing unit 405 may be configured as one or more dedicated integrated circuits, or may be a function module implemented by software. The image processing unit 405 performs various types of signal processing such as noise removal, demosaicing, luminance signal conversion, aberration correction, white balance adjustment, color correction, and the like on the captured image signal output from the image sensor 421, and generates image data (a captured image) in a format suitable for processing in the PC 300. The image processing unit 405 also performs rangefinding processing based on the principles of rangefinding in the imaging plane phase-difference detection rangefinding method (described later) and configures the asperity information.

A communication I/F 406 is an interface for making a communication connection with an external apparatus provided in the image capturing apparatus 320. The image capturing apparatus 320 of the present embodiment is connected to the PC 300, and thus the communication I/F 406 includes an interface for making a communication connection with the PC 300.

Figure 6A:
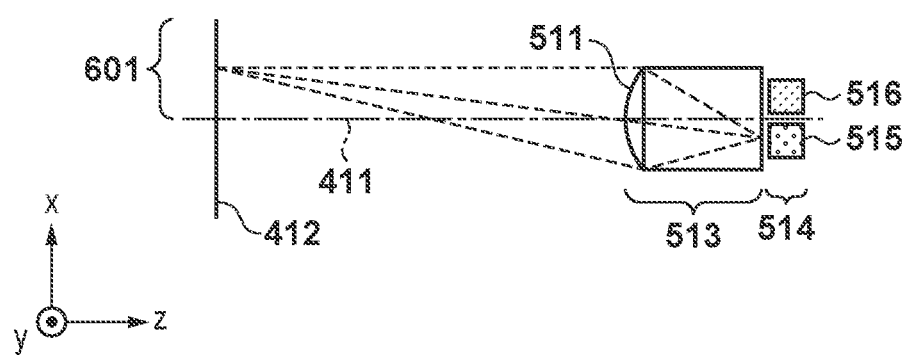
FIGS. 6A and 6B are diagrams illustrating the principles of rangefinding by the image capturing apparatus 320 according to the embodiments and variations of the present invention.
Figure 6B:
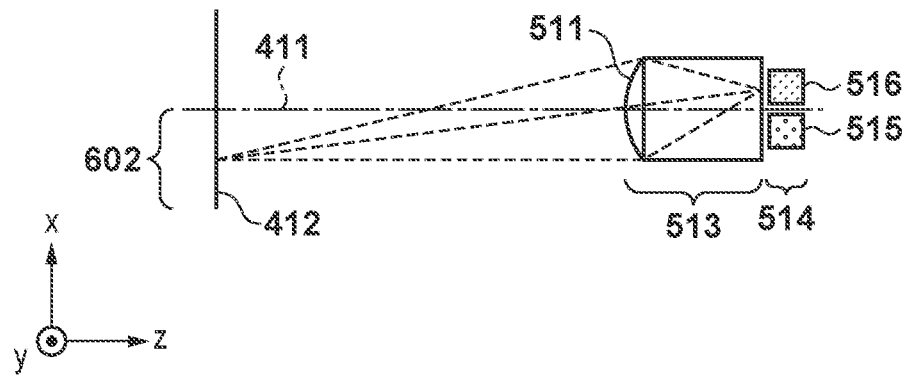

Principles of Rangefinding in Imaging Plane Phase-Difference Detection Rangefinding Method Next, the principle for measuring the subject distance based on the pupil-divided image group output from the first photoelectric conversion unit 515 and the second photoelectric conversion unit 516, which are used to configure the asperity information in the image processing unit 405, will be described with reference to FIGS. 6A, 6B, 7A, 7B, and 7C. FIG. 6A is a schematic diagram illustrating the exit pupil 412 in the optical imaging system 410, and a light beam received by a first photoelectric conversion unit 515 of a pixel in the image sensor 421. FIG. 6B is a schematic diagram illustrating a light beam received by the second photoelectric conversion unit 516 in the same manner.

The microlens 511 illustrated in FIGS. 6A and 6B is disposed such that the exit pupil 412 and the light receiving layer 514 are in an optically conjugate relationship. The light beam passing through the exit pupil 412 of the optical imaging system 410 is focused by the microlens 511 and guided to the first photoelectric conversion unit 515 or the second photoelectric conversion unit 516. At this time, the light beams passing through the different pupil regions are mainly received by the first photoelectric conversion unit 515 and the second photoelectric conversion unit 516, respectively, as illustrated in FIGS. 6A and 6B. The light beam passing through a first pupil region 601 is received by the first photoelectric conversion unit 515, and the light beam passing through a second pupil region 602 is received by the second photoelectric conversion unit 516.

The plurality of first photoelectric conversion units 515 provided in the image sensor 421 mainly receive the light beam passing through the first pupil region 601, and output first image signals. At the same time, the plurality of second photoelectric conversion units 516 provided in the image sensor 421 mainly receive the light beam passing through the second pupil region 602, and output second image signals. An intensity distribution of the image formed on the image sensor 421 by the light beams passing through the first pupil region 601 can be obtained from the first image signals. Likewise, an intensity distribution of the image formed on the image sensor 421 by the light beams passing through the second pupil region 602 can be obtained from the second image signals.

Figure 7A:
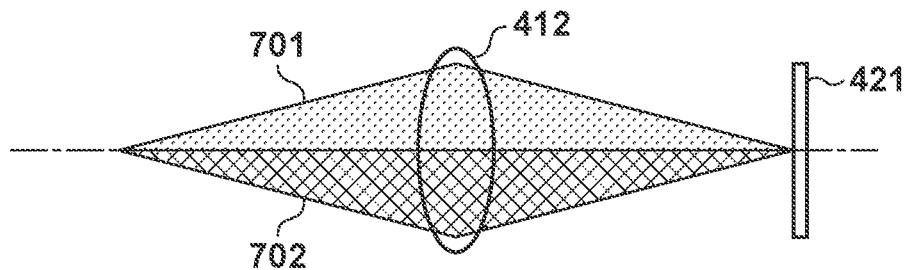
FIGS. 7A, 7B, and 7C are further diagrams illustrating the principles of rangefinding by the image capturing apparatus 320 according to the embodiments and variations of the present invention.
Figure 7B:
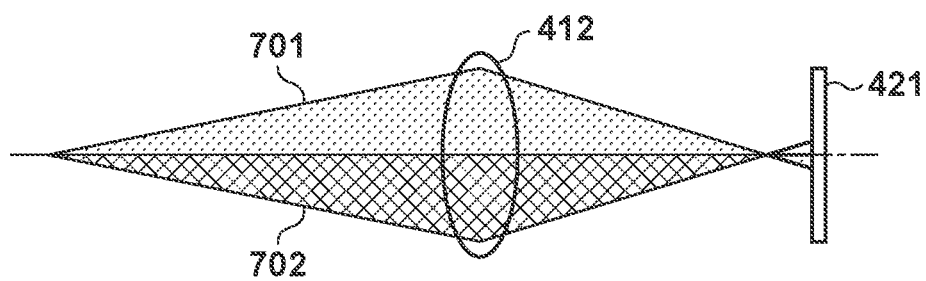
Figure 7C:
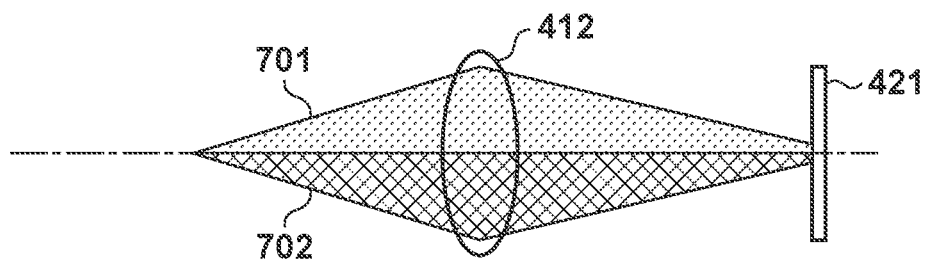

The amount of relative positional shift between the first image signals and the second image signals (what is known as a "parallax amount") is a value based on a defocus amount. The relationship between the parallax amount and the defocus amount will be described with reference to FIGS. 7A, 7B, and 7C. FIGS. 7A, 7B, and 7C are schematic diagrams illustrating a relationship between the image sensor 421 and the optical imaging system 410 of the present embodiment. Reference sign 701 in these drawings indicates a first light beam passing through the first pupil region 601, and reference sign 702 indicates a second light beam passing through the second pupil region 602.

FIG. 7A illustrates an in-focus state in which the first light beam 701 and the second light beam 702 converge on the image sensor 421. At this time, the parallax amount between the first image signal formed by the first light beam 701 and the second image signal formed by the second light beam 702 is 0. FIG. 7B illustrates a state of defocus in the negative direction of the z-axis on the image side. At this time, the parallax amount between the first image signal formed by the first light beam 701 and the second image signal formed by the second light beam 702 is not 0, but rather has a negative value. FIG. 7C illustrates a state of defocus in the positive direction of the z-axis on the image side. At this time, the parallax amount between the first image signal formed by the first light beam 701 and the second image signal formed by the second light beam 702 has a positive value. Comparing FIGS. 7B and 7C shows that the direction of the positional shift switches in accordance with whether the defocus amount is positive or negative. Furthermore, it can be seen that the positional shift occurs in accordance with the image formation relationship (geometric relationship) of the optical imaging system 410 according to the defocus amount. The parallax amount, which is the positional shift between the first image signal and the second image signal, can be detected by region-based matching processing.

Generation Processing

Figure 8:
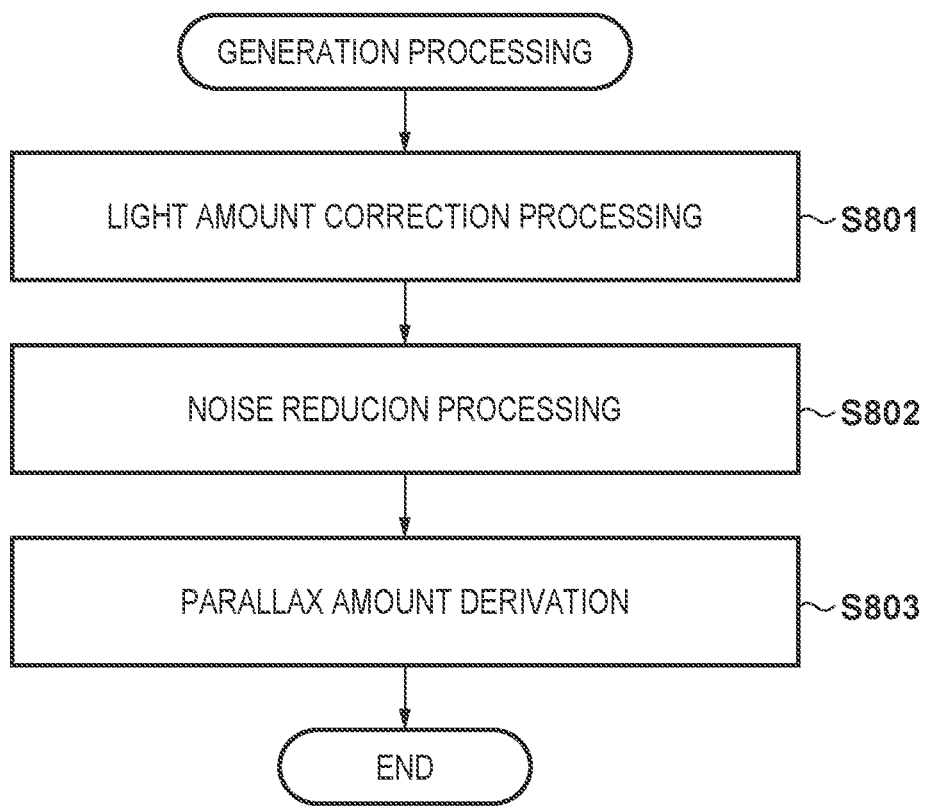
FIG. 8 is a flowchart illustrating an example of generation processing executed by the image capturing apparatus 320 according to the embodiments and variations of the present invention.

Processing by which the image processing unit 405 generates a depth image (distance information), which is the asperity information, based on the first image signal and the second image signal obtained when a shot is taken, will be described with reference to the flowchart in FIG. 8. The processing corresponding to the flowchart can be realized by, for example, the control unit 401 reading out a corresponding processing program stored in the storage apparatus 402, loading the program into the memory 403 (not shown), and executing the program. This generation processing will be described, for example, as being started when an image signal related to a shot is obtained by the image capturing unit 404 in response to a shooting instruction from the PC 300.

In step S801, the image processing unit 405 performs light amount correction processing on the first image signal and the second image signal. In the peripheral angle of view of the optical imaging system 410, vignetting produces differences in the shapes of the first pupil region 601 and the second pupil region 602, and thus the balance of the light amount between the first image signal and the second image signal is disrupted. Accordingly, in this step, the image processing unit 405 corrects the light amounts of the first image signal and the second image signal using, for example, a light amount correction value stored in advance in the memory 403.

In step S802, the image processing unit 405 performs processing for reducing noise produced during conversion in the image sensor 421. Specifically, the image processing unit 405 implements noise reduction by applying filter processing to the first image signal and the second image signal. In general, the SN ratio drops in high-frequency regions having high spatial frequencies, resulting in a relatively more noise components. Accordingly, the image processing unit 405 performs processing for applying a low-pass filter, in which the pass rate is reduced as the spatial frequency increases. Note that the light amount correction in step S801 may not produce a favorable result due to manufacturing error and the like in the optical imaging system 410, and thus it is preferable for the image processing unit 405 to block the DC component and apply a band pass filter having a low pass rate for high-frequency components.

In step S803, the image processing unit 405 derives the parallax amount between the images based on the first image signal and the second image signal. To be more specific, the image processing unit 405 sets, in the first image signal, a point of interest corresponding to representative pixel information, and a verification region centered on that point of interest. The verification region may be, for example, a quadrangular region, such as a square region in which one side has a predetermined length centered on the point of interest. Next, the image processing unit 405 sets a reference point in the second image signal, and sets a reference region centered on the reference point. The reference region has the same size and shape as the above-described verification region. While moving the reference point in sequence, the image processing unit 405 derives a degree of correlation between the image included in the verification region of the first image signal and the image included in the reference region of the second image signal, and identifies the reference point having the highest degree of correlation as a corresponding point corresponding to the point of interest in the second image signal. A relative amount of positional shift between the corresponding point and the point of interest identified in this manner is the parallax amount at the point of interest.

The image processing unit 405 derives the parallax amount at a plurality of pixel positions set according to the representative pixel information by calculating the parallax amount while sequentially changing the point of interest according to the representative pixel information in this manner. For the sake of simplicity, the present embodiment assumes that the pixel positions (pixel groups included in the representative pixel information) at which the parallax amounts are calculated are set to be the same number as in the image for viewing, in order to obtain a depth image at the same resolution as the image for viewing. Methods such as Normalized Cross-Correlation (NCC), Sum of Squared Difference (SSD), or Sum of Absolute Difference (SAD) may be used to derive the degree of correlation.

The derived parallax amount can be converted into a defocus amount, which corresponds to a distance from the image sensor 421 to the focal point of the optical imaging system 410, by using a predetermined conversion coefficient. Here, if the predetermined conversion coefficient is represented by K and the defocus amount is represented by $\Delta L$, the parallax amount can be converted into a defocus amount as follows:

$$\Delta L = K \times d$$

Furthermore, the defocus amount $\Delta L$ can be converted to the subject distance by using the lens formula in geometric optics:

$$1/A + 1/B = 1/F$$

Here, A represents the distance from the surface of the subject to a principal point of the optical imaging system 410 (the subject distance), B represents the distance from the principal point of the optical imaging system 410 to the image plane, and F represents the focal length of the optical imaging system 410. In other words, the lens formula, the value of B can be derived from the defocus amount $\Delta L$, and thus the subject distance A from the optical imaging system 410 to the subject surface can be derived based on the setting of the focal length when the image is captured.

The image processing unit 405 configures 2D information in which the subject distance derived in this manner serves as the pixel values (the depth image) and stores that information in the memory 403 as the asperity information.

Overview of Photographing and Printing Service

An overview of a service provided by the photo sticker apparatus 100 of the present embodiment (called a "photographing and printing service" hereinafter) will be described next.

The photo sticker apparatus 100 starts providing the photographing and printing service when the payment detection unit 304 detects that a fee has been paid. The photographing and printing service is constituted by a photographing part, in which the user enters the photo booth 110 and takes a predetermined number of shots, and an editing part, in which the user moves to the editing booth 120 and performs desired editing operations on the shot image obtained in the photographing part. An output image generated when editing is applied in the editing part is printed onto sticker paper after the editing part is finished, and is then provided to the user.

In general in the photographing part, a theme for the photography is set, guidance audio based on that theme is used to guide the subject in terms of a pose, facial expression, the timing of the shots, and the like, and a plurality of shots are then taken. Each time a shot is taken, a preview of the shot image is displayed in the first display apparatus 340, and the user can confirm his/her appearance in the image and adjust his/her pose, facial expression, and the like for the next shot. Meanwhile, in the editing part, the user can select a predetermined number of images to be edited from among the plurality of shot images obtained in the photographing part, select an editing menu provided in advance, and edit the images (retouching and the like).

Note that as illustrated in FIGS. 1A and 1B, in an embodiment in which the photo booth 110 and the editing booth 120 are provided in different spaces, a single photo sticker apparatus 100 can be used by several groups of users in parallel. In the embodiment illustrated in FIGS. 1A and 1B, the editing booth 120 is provided with two sets of the units of the second display apparatus 360, the second speaker 370, and the input apparatus 380, and thus the photo sticker apparatus 100 can provide services to three sets of users simultaneously. Time limits are set in advance for both the photographing part and the editing part for a single use, respectively, but the time limits may be adjusted as appropriate in accordance with the usage conditions of the other booth.

Editing Functions

Editing functions provided by the photo sticker apparatus 100 of the present embodiment will be described hereinafter. The various types of editing functions are functions, configured to be usable by selecting editing menus in the editing part, which apply predetermined image processing to the shot image in accordance with operation inputs made using the input apparatus 380.

The editing functions that can be used in the photo sticker apparatus 100 of the present embodiment include a normal editing function provided in conventional photo sticker apparatuses 100, and a 3D editing function according to the present invention. The normal editing function provides editing functions which apply, to a shot image, various types of image processing corresponding to 2D information, such as deforming a subject image appearing in the shot image, changing a background image, applying color filters, superimposing 2D image elements (stamps, graffiti images, and the like), other types of retouching, and so on. Here, a "graffiti image" is a 2D image representation of the trajectory of handwritten input from the user, which has been input using the stylus pen, for example. An editing function pertaining to the eyeball part of the subject provided as a normal editing function includes, for example, processing for deforming and expanding eye and pupil regions in the shot image, processing for enhancing eye lines, processing for adding eye makeup, catch lights, processing for changing the color of the pupils, and the like. On the other hand, basically, the 3D editing function does not directly process the shot image or apply image processing, but instead provides an editing function that includes processing for generating 3D data for each person based on shot images and asperity information obtained at the same time, and changing the form thereof. Accordingly, the normal editing function and the 3D editing function are starkly distinguished in terms of whether 3D data of the subject is generated.

3D Editing Function

The 3D editing function provided by the photographing and printing service of the present embodiment will be described in detail with reference to the drawings. The 3D editing function is mainly constituted by a construction stage that generates 3D data of the subject, an editing stage that changes the form of the generated 3D data, and a rendering stage that generates an image corresponding to the 3D data to which changes have been applied.

The construction stage is a preparatory stage of the 3D editing function, started in response to a corresponding editing menu being selected. In the construction stage, the second image processing unit 308 generates 3D data of each subject based on the shot image to which the 3D editing function is applied and the asperity information obtained corresponding to the shot image. As described above, the asperity information holds the subject distance for each pixel in the shot image, and thus a distance distribution in the depth direction of the pixels in the regions of each subject as viewed from the image capturing apparatus 320 can be obtained by specifying the regions in which each subject appears. Accordingly, a 3D model of the subject in the direction viewed from the image capturing apparatus 320 can be constructed by providing xy coordinates for each pixel in a region of the subject in accordance with pixel positions, further defining vertices that provide z coordinates in accordance with a distance in the depth direction, and generating a mesh that connects the vertices. 3D data of the subject is generated by applying an image of the region of the subject extracted from the shot image to the constructed 3D model as a texture. It goes without saying that the method for generating the 3D data described here is merely an example, and that smoothing processing, approximation processing for reducing the number of vertices, and the like may be further performed, or the generation may be performed using other methods for generating the 3D data from the shot image and the asperity information.

The editing stage and the rendering stage are a stage of applying changes to the 3D data in response to operation inputs by the user, and a stage of generating an image corresponding to the 3D data to which such changes have been applied for the user to confirm, respectively, and are repeated while the 3D editing function is being used. In the 3D editing function of the present embodiment, the user can perform operation inputs for changing the orientation of the 3D data for each subject. To make it easier to understand the invention, it is assumed that the change to the orientation of the 3D data of each subject in the present embodiment is performed by rotating the entire instance of 3D data about a y-axis passing through reference coordinates of the 3D data. Here, the y-axis is an axis defined in the vertical direction of a plane orthogonal to the optical axis 411 of the image capturing apparatus 320 (the vertical direction of the shot image; the height direction of the 3D data of the subject).

When an operation input pertaining to an orientation change is made and orientation parameters of the 3D data of the subject are changed, the orientation parameters after the change are applied to the 3D data in the rendering stage, and an image to be displayed in the second display apparatus 360 is generated. The image corresponding to the 3D data is generated by placing the 3D data in a 3D space, and rendering the 3D space with a camera defined in the 3D space.

Here, "3D space" is a concept for expressing the space in the photo booth 110 virtually, and may be introduced, for example, on a scale in which 1 m in the real world corresponding to 1 in the 3D space. Furthermore, parameters such as the position, orientation (direction of the line of sight), and angle of view for the camera defined in the 3D space for rendering are set in accordance with the position, shooting direction, and angle of view of the image capturing apparatus 320. Accordingly, an image equivalent to the shot image can be generated without changing the orientation by placing and rendering the 3D data generated in the construction stage such that the relative placement relationship with the camera corresponds to the placement relationship between the subject and the image capturing apparatus 320 when the shot image is shot. Furthermore, by applying a rotation matrix pertaining to the orientation parameters after the change to the 3D data of the subject and performing rotation, and then placing and rendering the 3D data in a position in the 3D space corresponding to the standing position of the subject during shooting, the image can be generated as if the subject had changed orientation.

Figure 9A:
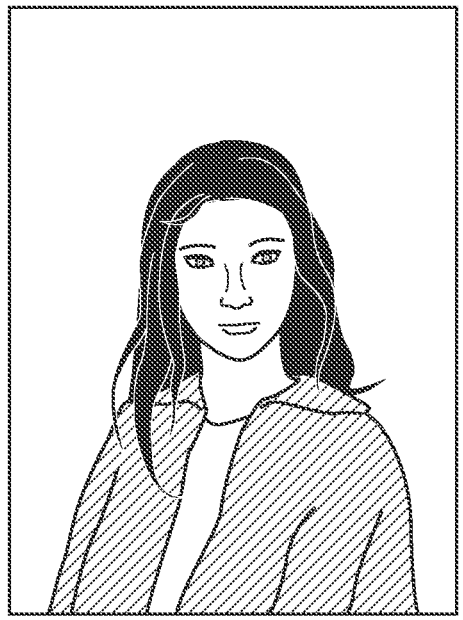
FIGS. 9A, 9B, 9C, and 9D are diagrams illustrating a 3D editing function of the photo sticker apparatus 100 according to a first embodiment of the present invention.
Figure 9B:
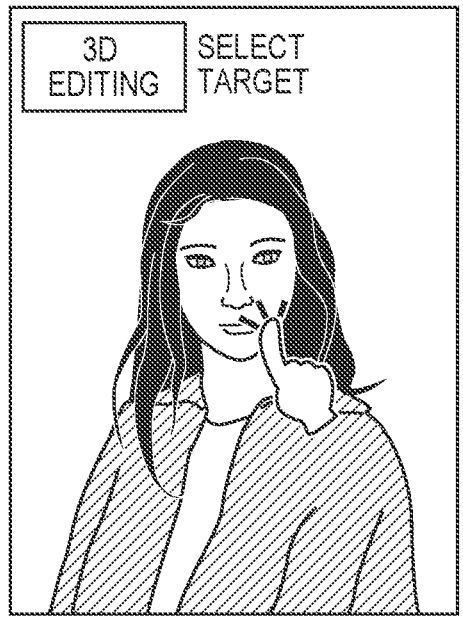
Figure 9C:
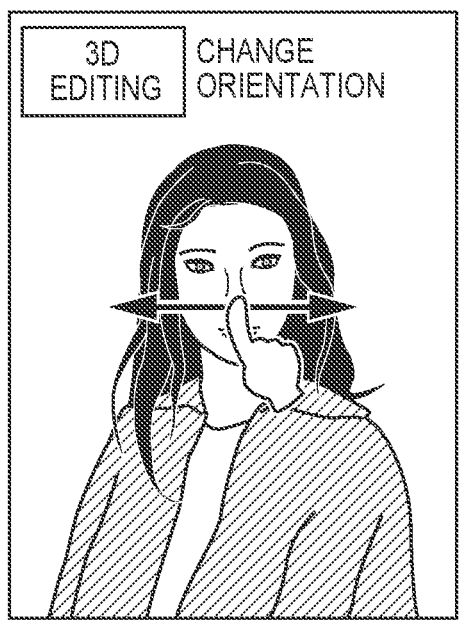
Figure 9D:
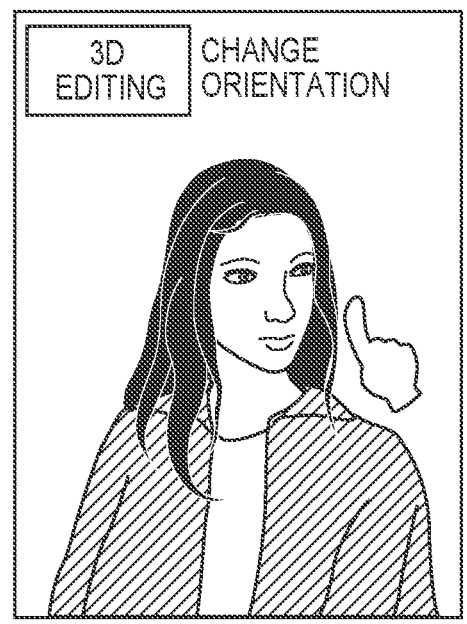

For example, an embodiment in which the 3D editing function is performed on the shot image as illustrated in FIG. 9A will be described in terms of the operations thereof and the flow of the image displayed in the second display apparatus 360. When a menu for the 3D editing function is selected, 3D data of each subject is generated using the shot image and the asperity information, and an image equivalent to that illustrated in FIG. 9A is generated by placing and rendering that 3D data in the 3D space. As illustrated in FIG. 9B, the user can change the orientation of the 3D data of a target subject by selecting a single subject to be manipulated (the target subject). The user can then make operation inputs for changing the orientation of the 3D data of the target subject by making touch operations in the second display apparatus 360 that involve movement in the horizontal direction, as illustrated in FIG. 9C. For example, if a touch operation involving horizontal rightward movement is performed, the orientation applied to the 3D data of the target subject is changed, and in the image displayed in the second display apparatus 360 after the rendering stage, the image of the target subject appears as illustrated in FIG. 9D, i.e., turned to the right.

In this manner, the 3D editing function of the present embodiment can generate an image in which the subject has been corrected to a state in which the subject is facing a direction different from the direction the subject was facing when the image was shot. Incidentally, the asperity information obtained from the image capturing apparatus 320 of the present embodiment is constituted by information on a shooting direction (the depth direction). There are thus cases where the 3D data of the subject generated in the construction stage does not have a valid surface, texture, or the like, e.g., in parts of the subject that do not appear in the shot image (shielded parts, the rear of the subject, and the like). In other words, if the orientation is changed to an angle where such a part of the 3D data will be captured by the camera, a suitable image will not be generated. Accordingly, it is assumed that changes in the orientation of the 3D data that can be accepted by the 3D editing function are limited to a certain changeable range such that an invalid surface, texture, or the like is not oriented toward the camera. The changeable range can be derived, for example, based on the shot image and the asperity information used to generate the 3D data.

Note that to make it easier to understand the present embodiment, the 3D editing function is described as being capable of accepting a change to the orientation of the 3D data of the subject, but the present invention is not limited thereto. In the 3D editing function, it may be possible to accept a change to the position of the 3D data of the subject (translational movement).

When the editing in these editing parts is complete, an output image, in which edits based on the operation inputs made through the various editing functions are applied to the shot image, is generated, transmitted to the printing apparatus 390, and printed. Although sticker paper is employed as the print medium in the photo sticker apparatus 100 of the present embodiment, the print medium printed out by the printing apparatus 390 may be any print medium.

Provision Processing

Figure 10:
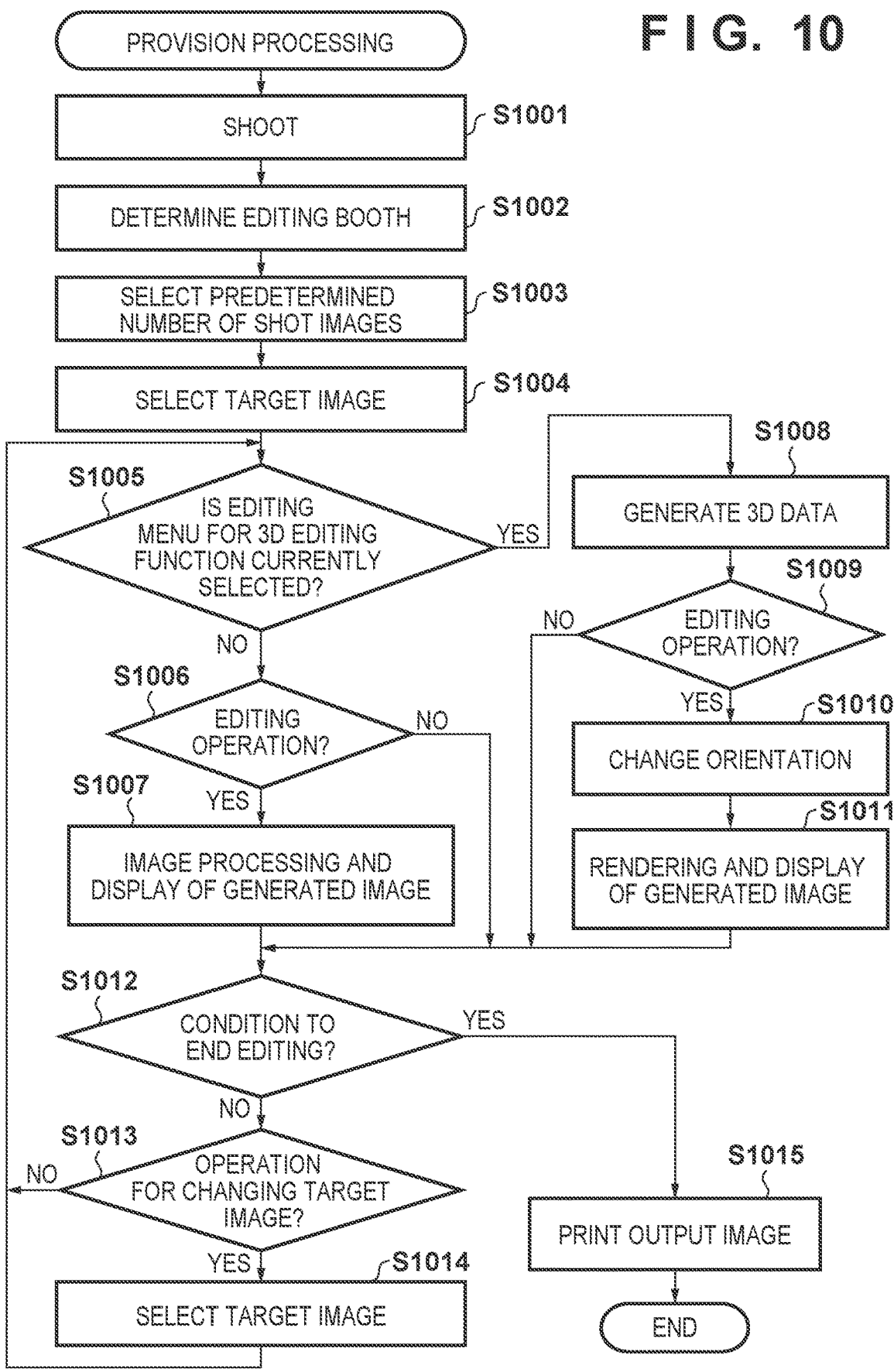
FIG. 10 is a flowchart illustrating an example of the provision processing executed by the photo sticker apparatus 100 according to the first embodiment of the present invention.

The specifics of provision processing executed in the photo sticker apparatus 100 of the present embodiment configured in this manner, for providing a photographing and printing service to a single group of users, will be described with reference to the flowchart in FIG. 10. The processing corresponding to the flowchart can be realized by, for example, the control unit 301 reading out a corresponding processing program stored in the storage apparatus 302, loading the program into the memory 303, and executing the program. This provision processing will be described as starting, for example, when the payment detection unit 304 detects that a fee has been paid in the payment apparatus 130.

In step S1001, the control unit 301 starts the processing pertaining to the photographing part, and takes a shot of the user in the photo booth 110. The processing pertaining to shooting may include processing for accepting settings of the theme for shooting (the atmosphere, number of people, background, and the like) in advance. The image capturing control unit 305 causes the image capturing apparatus 320 to take a specified number of shots under the control of the control unit 301, and causes the captured image and the asperity information obtained at the same time as the captured image to be output for each shot. The captured image and the asperity information output from the image capturing apparatus 320 are stored in the memory 303, for example, in association with each other. Once the specified number of shots have been taken, the control unit 301 moves the sequence to step S1002.

In step S1002, the control unit 301 determines a unit in the editing booth 120 that is to be used by a user (the editing function to be provided). As described above, in the photo sticker apparatus 100 of the present embodiment, two sets of units are provided for the second display apparatus 360, the second speaker 370, and the input apparatus 380. Accordingly, the control unit 301 determines a unit that is not currently being used by another user in this step as the unit to be used by the user. Upon determining the unit to be used, the control unit 301 then causes the first presentation control unit 307 to present various types of information pertaining to movement to that unit.

Next, the control unit 301 starts processing pertaining to the editing part. The processing of steps S1003 to S1014 pertaining to the editing part, performed thereafter, is performed using the second image processing unit 308, the second presentation control unit 309, the second display apparatus 360, the second speaker 370, and the input apparatus 380 in the unit to be used by the user.

In step S1003, the control unit 301 accepts the selection of a predetermined number of shot images to be edited from among the captured images shot in step S1001. At this time, the second presentation control unit 309 causes the captured images which are candidates for selection to be displayed in the second display apparatus 360. Once the selection of the predetermined number of shot images is complete, the control unit 301 moves the sequence to step S1004.

In step S1004, the control unit 301 selects a single shot image (a target image), for which operation inputs for editing are to be accepted, from the predetermined number of shot images to be edited. To make it easier to understand the invention, the present embodiment assumes that only one image can be edited at a time, but the present invention is not limited thereto. For example, in an embodiment in which two users can edit different shot images at the same time, there may be two target images. The selection of the target image in this step may be made based on a predetermined rule, such as an image having the oldest shooting time among the shot images to be edited, for example. Information on the selected target image is stored in the memory 303.

In step S1005, the control unit 301 determines whether the editing menu currently selected is an editing menu for the 3D editing function. If the control unit 301 determines that the editing menu currently selected is an editing menu for the 3D editing function, the control unit 301 moves the sequence to step S1008. However, if the control unit 301 determines that the editing menu currently selected is not an editing menu for the 3D editing function, i.e., that the editing menu is an editing menu for the normal editing function, the control unit 301 moves the sequence to step S1006.

In step S1006, the control unit 301 determines whether an operation input pertaining to editing has been accepted. If the control unit 301 determines that an operation input pertaining to editing has been accepted, the control unit 301 moves the sequence to step S1007, and if not, the control unit 301 moves the sequence to step S1012.

In step S1007, under the control of the control unit 301, the second image processing unit 308 generates an image to which the image processing has been applied to the target image in accordance with the accepted operation input. The second presentation control unit 309 then displays the generated image in the second display apparatus 360. Although the image processing pertaining to the normal editing function will not be described in the provision processing of the present embodiment, the image processing applied in this step includes various types of 2D image processing described above.

On the other hand, if it is determined in step S1005 that the editing menu currently selected is an editing menu for the 3D editing function, the second image processing unit 308 generates, under the control of the control unit 301, the 3D data of the subject included in the target image in step S1008. Specifically, the second image processing unit 308 specifies a region for each subject present in the target image, and generates 3D data for each subject with reference to corresponding asperity information. The generated 3D data is stored in the memory 303. Note that it is sufficient to generate the 3D data of a subject once for each shot image, and this step may be skipped if 3D data has already been generated.

In step S1009, the control unit 301 determines whether an operation input pertaining to editing has been accepted. In the provision processing of the present embodiment, an operation input pertaining to an instruction to change the orientation of the 3D data of the subject is accepted in the editing menu for the 3D editing function. If the control unit 301 determines that an operation input for editing has been accepted, the control unit 301 moves the sequence to step S1010, and if not, the control unit 301 moves the sequence to step S1012.

In step S1010, for the subject for which the operation input has been accepted, the control unit 301 changes the parameters of the orientation of the 3D data to values based on the operation input.

In step S1011, under the control of the control unit 301, the second image processing unit 308 places the 3D data of the subject in the 3D space, with the parameters changed in step S1010 applied thereto, and performs rendering as a camera from a viewpoint set so as to correspond to the image capturing apparatus 320. The second presentation control unit 309 then displays the image generated through the rendering in the second display apparatus 360.

In step S1012, the control unit 301 determines whether a condition to end the editing part is satisfied. The condition to end the editing part may be, for example, that a set time limit has elapsed, that an operation input pertaining to the end of editing has been accepted, or the like. If the control unit 301 determines that the condition to end the editing part is satisfied, the control unit 301 moves the sequence to step S1015, and if not, the control unit 301 moves the sequence to step S1013.

In step S1013, the control unit 301 determines whether an operation input for changing the target image has been accepted. If the control unit 301 determines that an operation input for changing the target image has been accepted, the control unit 301 moves the sequence to step S1014, and if not, the control unit 301 returns the sequence to step S1005.

In step S1014, based on the operation input for changing the target image that has been accepted, the control unit 301 selects the corresponding shot image, among the shot images to be edited, as the target image, and then returns the sequence to step S1005.

Note that when the target image is changed, it is assumed that information on the content of the editing performed thus far is stored and held in the memory 303. In other words, information on the image processing performed in step S1007 and information on the orientation change made in step S1010 is held for each shot image, and that information is applied when the same shot image is selected as the target image and edited again. For example, the changed orientation parameters are held for the 3D data of the subject pertaining to each shot image, and when the same target image is selected and editing using the 3D editing function is performed again, the image can be restored to reflect the changes which have already been made. Additionally, a graffiti image may be superimposed using the normal editing function after edits have been made using the 3D editing function, and in this case, the image to which the normal editing function is applied is an image generated using 3D data from the 3D editing function. Accordingly, when the target image is changed, the image generated in step S1011 is also stored and held in the memory 303. Such information may be held not only when the target image is changed, but also when the details selected in the editing menu are changed.

If it is determined in step S1012 that the condition to end the editing part is satisfied, the output control unit 311 transmits, under the control of the control unit 301, the output image reflecting the content of the edits made in the processing involved in the editing part to the printing apparatus 390, and causes the image to be printed onto sticker paper, in step S1015. The output image printed in this step is based on the shot image selected to be edited, and is a shot image to which the image processing of the normal editing function has been applied or an image generated by rendering the 3D data of the subject through the 3D editing function. Alternatively, the output image may be an image to which image processing of the normal editing function has been applied to an image generated by rendering the 3D data of the subject through the 3D editing function. Note that a shot image that has been selected as the shot image to be edited but has not yet been edited may be selected as an output image as-is. The control unit 301 completes the provision processing once the printing output by the printing apparatus 390 is complete.

As described above, according to the image processing system of the present embodiment, it is possible to make it easier for the user to obtain an output in a desired state. More specifically, it is possible to generate 3D data of a subject in a 3D editing function and use an image in which the orientation of the 3D data has been changed as an output image, and thus output which is close to the desired state can be provided even if the subject was not captured in the desired state.

First Variation

Although the foregoing embodiment described a situation in which, in the 3D editing function, the orientation of the 3D data of the subject is changed by accepting an operation input pertaining to an orientation change, the present invention is not limited thereto. For example, a user unfamiliar with adjusting 3D data of a subject may find it difficult to complete the operation input for putting the image into a suitable state within the time limit. Accordingly, for example, based on information on recommended orientations registered in advance, the second image processing unit 308 may change the orientation to a recommended orientation without accepting an operation input from the user specifying an orientation. Here, the information on the recommended orientation may be determined for each theme for shooting, number of subjects, and subject pose, or may be derived from learning models that have learned information on orientation adjustment performed by the same user or another user in the past.

Second Embodiment

Although the foregoing embodiment described an example of the 3D editing function in which an operation input for changing the orientation by rotating the entire 3D data is accepted as the operation input for changing the form of the generated 3D data of the subject, the present invention is not limited thereto. The operation input for changing the orientation may be for changing the orientation of a part of the subject instead of the entire 3D data of the subject.

For example, in an embodiment where the subject is a person, as in the first embodiment, an operation input that changes the orientation of the head of the subject in the 3D data of the subject may be accepted. The operations for changing the orientation of the head and the flow of the image displayed in the second display apparatus 360 may be as illustrated in FIGS. 11A, 11B, and 11C. The user can change the orientation of the 3D data in the head of the target subject by selecting a target subject for a face direction change, as illustrated in FIG. 11A. The user can then make operation inputs for changing the orientation of the head by making touch operations in the second display apparatus 360 that involve movement in the horizontal direction, as illustrated in FIG. 11B. For example, if a touch operation involving horizontal rightward movement is performed, the orientation applied to the 3D data of the head of the target subject is changed. Then, in the image displayed in the second display apparatus 360 after the rendering stage, the image of the target subject is displayed with the head rotated to the right, as illustrated in FIG. 11C.

Changing the orientation of the head makes it possible to, for example, turn the face of the subject to the front, align the direction of the face with another subject, and the like, which makes it possible to expand the range of expressions of the subject in the output image. In another aspect, the head is more likely than the torso to show changes in the asperity of the human body, and changes in the appearance due to changes in the orientation are more noticeable in the output image. In another aspect, the head, which is closer to a spherical shape than the torso, can cover an expression from the side, which makes it easier to expand the range over which the orientation of the 3D data can change than if the entire body were rotated.

Additionally, for example, in an embodiment in which the 3D data of the subject is generated using eyeball parts as individual parts, the subject may accept an operation input that changes the orientation of the eyeball parts of the 3D data of the subject. If the orientation of the overall 3D data of the subject, the head, or the like has been changed as described above, the line of sight of the subject may change in an unintended direction in the output image. Furthermore, in a state where the image captured by the image capturing apparatus 320 is displayed as a through-the-lens image by the first display apparatus 340 in the photo booth 110, the user is looking at the first display apparatus 340, and thus the subject's line of sight may be in an unintended direction in the shot image. Accordingly, making it possible to change the orientation of the eyeball part makes it possible to generate an output image in which the subject is looking at the camera.

Figure 12A:
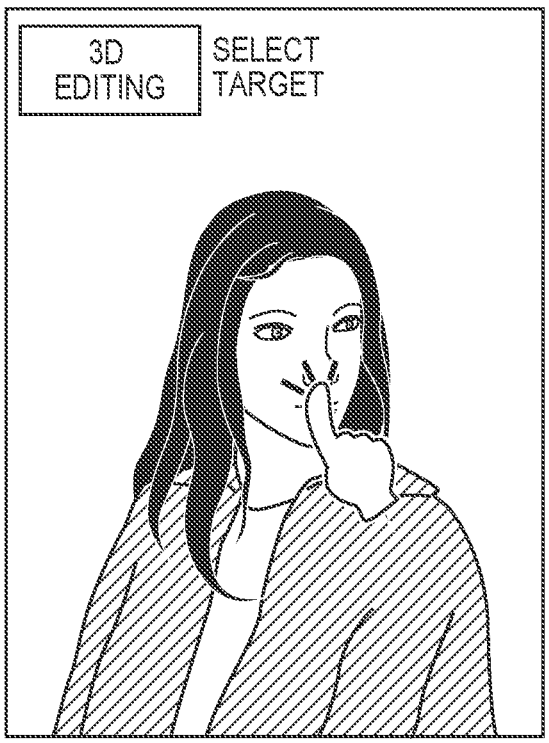
FIGS. 12A, 12B, 12C, and 12D are further diagrams illustrating a 3D editing function of the photo sticker apparatus 100 according to the second embodiment of the present invention.
Figure 12B:
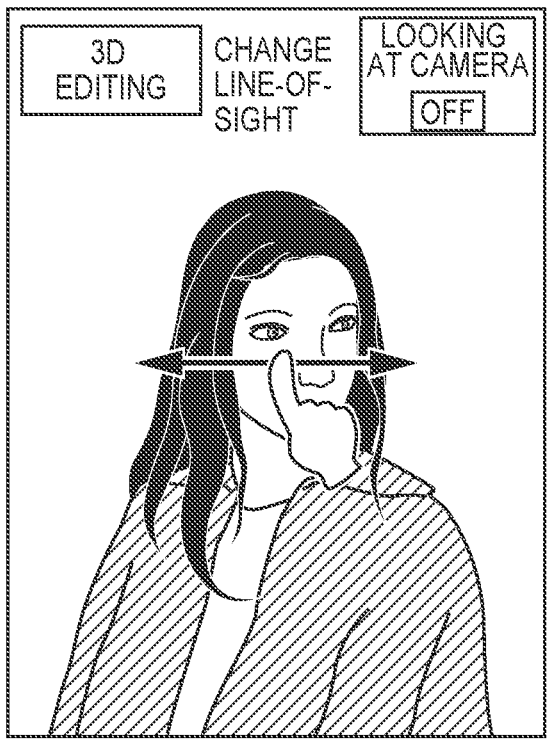
Figure 12C:
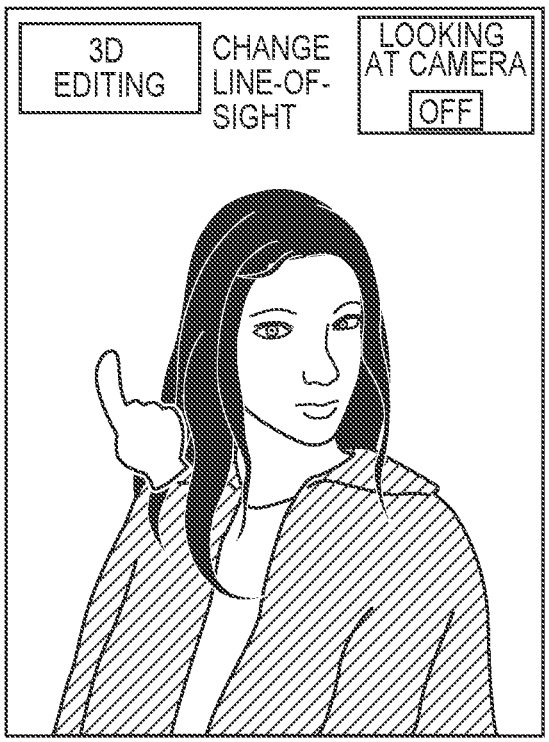

The operations for changing the orientation of the eyeball parts and the flow of the image displayed in the second display apparatus 360 may be as illustrated in FIGS. 12A, 12B, 12C, and 12D. The user can change the orientation of the 3D data of the eyeball parts of the target subject by selecting a target subject for which the line of sight is to be changed, as illustrated in FIG. 12A. The user can then make operation inputs for changing the orientation of the eyeball part by making touch operations in the second display apparatus 360 that involve movement in the horizontal direction, as illustrated in FIG. 12B. For example, if a touch operation involving horizontal leftward movement is performed, the orientation applied to the 3D data of the eyeball part of the target subject is changed. Then, in the image displayed in the second display apparatus 360 after the rendering stage, the image of the target subject is displayed with the eyeball part rotated to the left, as illustrated in FIG. 12C.

Figure 12D:
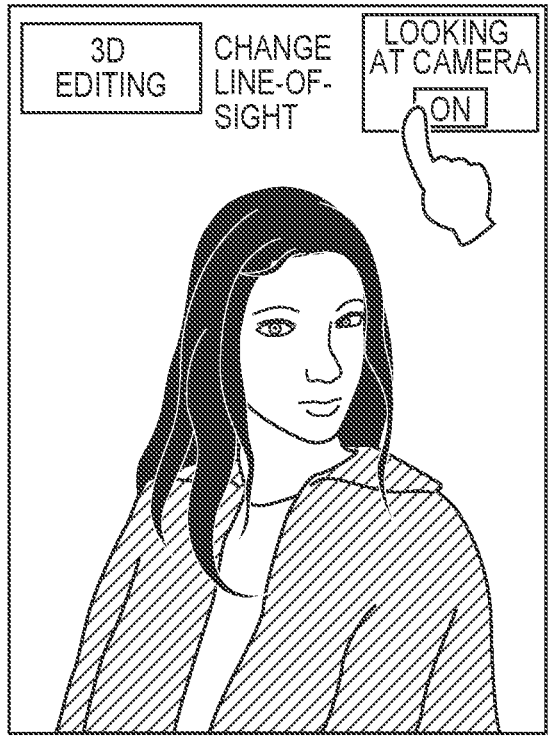

Note that FIGS. 12B and 12C illustrate an example in which an option for looking at the camera is turned off, and the user manually adjusts the amount by which the orientation of the eyeball parts is changed. However, adjustments made based on information that serves as the basis for adjusting the line of sight (e.g., the direction of the camera (the viewpoint from which the image is rendered)), such as the camera line of sight, may be made by the second image processing unit 308 without accepting an operation input for changing the orientation from the user. For example, after selecting the target subject in FIG. 12A, the user can turn on the option for looking at the camera as indicated in FIG. 12D, to derive and apply an amount of change in the orientation of the eyeball parts of the target subject toward the viewpoint used when rendering the image.

Second Variation

Although the foregoing second embodiment described a situation in which the orientation of the eyeball parts of the 3D data of the subject is changed in order to change the way in which the subject's line of sight is expressed in the 3D editing function, the present invention is not limited thereto. The subject's line of sight may be expressed by changing textures applied to the eyeball parts. The texture change may be performed, for example, by moving a pupil position in the texture. At this time, the configuration can be such that an operation input is accepted from the user to change the line of sight and enable the line of sight to be changed in any direction, or such that the change is applied based on information serving as the basis for line of sight adjustment, such as the direction of the viewpoint during rendering, without accepting an operation input from the user.

Third Variation

Although the foregoing embodiments and variations described examples in which the 3D editing function changes the form of the 3D data by changing the orientation of at least some of the generated 3D data of the subject, the present invention is not limited thereto. The change in the form of the 3D data of the subject may be any change as long as the state of the subject that ultimately appears in the output image is changed three-dimensionally, such as by the second image processing unit 308 changing the direction of rendering. In other words, in the 3D editing function, it may be possible to accept an operation input for changing the parameters (position and line of sight) of the camera that renders the 3D space in which the 3D data of the subject is placed, and an image in which the 3D space is rendered may be generated by the camera to which the operation input has been applied.

Fourth Variation

The foregoing embodiments and variations described examples in which a single image capturing apparatus 320 is provided in the photo sticker apparatus 100, asperity information pertaining to the image capturing direction of the image capturing apparatus 320 is obtained for the shot image, and 3D data of the subject is generated using that information. On the other hand, the 3D data of the subject generated from the shot image and the asperity information obtained in one shooting direction in this manner may not have a valid surface, texture, or the like, as described above, and thus the range of the change that can be applied may be limited. Accordingly, a set of a plurality of types of shot images and asperity information may be used when generating the 3D data of a subject.

A set of a plurality of types of shot images and asperity information may be obtained by providing a plurality of image capturing apparatuses 320 in different positions in the photo sticker apparatus 100, and taking shots with those image capturing apparatuses 320 synchronized in the photographing part. Alternatively, a single image capturing apparatus 320 may combine sets of shot images and asperity information obtained through multiple shots taken. In addition, rather than being limited to shooting, the captured image and the asperity information may be obtained based on the image signal output by the image capturing unit 404 at any timing in the photographing part, and may then be used to generate the 3D data.

Using captured images in which the form of the subject is expressed differently and asperity information corresponding to the captured images makes it possible to supplement the information of parts that cannot be covered by a single image capturing direction. As a result, the range within which the form of the 3D data of the subject can be changed can be expanded.

Third Embodiment

Although the foregoing embodiments and variations described examples in which the 3D editing function changes the form of the 3D data by changing the orientation of at least some of the generated 3D data of the subject, the present invention is not limited thereto. Changes to the form of the 3D data of the subject may include changes in the shape of the 3D data.

In other words, a change to the shape of the 3D data, i.e., a deformation, is, for example, changing the length or definition of the nose, or the smoothness of the cheekbones, the shape of contours, and may be performed by stretching or shrinking a part of the 3D data in a predetermined direction. While 3D data deformation is achieved by moving the vertices of the meshes that constitute the 3D data, such mesh deformation can require specialized knowledge. Accordingly, in the photo sticker apparatus 100 of the present embodiment, information on the editable parameters (length, size, and the like) and the deformation mode of the mesh for each parameter is assumed to be set in advance for the site to be deformed (the nose, definition, and the like). Accordingly, the second image processing unit 308 deforms the 3D data of the target subject based on the information on the deformation mode when a part to be deformed and a parameter to be edited are selected and an operation input for changing the parameter is accepted.

For example, when changing the length of the nose or the like, it is necessary to specify a part corresponding to the nose in the 3D data of the subject, and move the vertices included in the mesh of that part in the length direction, i.e., in the frontal direction of the face of the subject. Accordingly, for example, when generating the 3D data, it is assumed that the second image processing unit 308 recognizes which is the frontal direction of the subject, which is the position of each part of the subject, and the like based on at least one of the shot image and the asperity information.

The operations for changing the shape of the 3D data of the subject and the flow of the image displayed in the second display apparatus 360 may be as illustrated in FIGS. 13A, 13B, and 13C. FIGS. 13A, 13B, and 13C illustrate an example of the display when the part to be deformed is "nose" and the parameter to be changed is "length". By selecting a target part for which the parameter is to be changed as illustrated in FIG. 13A, the user can perform an operation for changing the parameter of a desired part of the 3D data. Then, by making a touch operation on the second display apparatus 360 that moves in the vertical direction on a slider 1301 pertaining to changing the parameter, as illustrated in FIG. 13B, the user can make an operation input for changing the parameter of the length of the nose. For example, if a touch operation is made to move the slider 1301 vertically upward (a direction that increases the length), the shape of the 3D data of the target subject's nose is changed according to the parameter. Then, the nose of the target subject appears elongated in the length direction of the nose, as illustrated in FIG. 13C, in the image displayed in the second display apparatus 360 after the rendering stage. Alternatively, instead of accepting parameter changes through adjustment of the slider 1301, a plurality of parameter candidates may be selected, a group of images in which are rendered 3D data reflecting the deformation for each candidate may be displayed, and the user may be allowed to select the details of the changes.

Although functions for changing the two-dimensional shape of a subject's eyes and the like can be found in editing functions employed in conventional photo sticker apparatuses, such functions do not recognize parts of the subject and deform those parts according to the original nature thereof as per the photo sticker apparatus 100 of the present embodiment. According to the function for deforming 3D data of a subject in the 3D editing function of the of the present embodiment, the subject in a state where the deformation has been applied can be represented with a more natural finish, particularly in applications where the output image represents the subject in a different orientation from that when the image was shot.

Fifth Variation

Although the foregoing embodiments and variations described examples in which the method for changing the form of the 3D data of the subject involves changing the orientation, position, or shape of the 3D data, or changing the viewpoint from which the 3D data is rendered, the present invention is not limited thereto. The 3D data may be changed through other methods or by a combination of various changing methods. The change instructions pertaining to these changes are also not limited to being based on operation inputs made by the user, and may instead be based on results derived by referring to predetermined information or by performing predetermined calculations.

Sixth Variation

The foregoing first embodiment discussed a method that enables editing such as superimposing a graffiti image using the normal editing function onto an image in which 3D data of a subject whose orientation has been changed through the 3D editing function has been rendered. In other words, the first embodiment described an example in which the 3D editing function only has a function for accepting changes to the form of the 3D data of a subject and generating an image reflecting those changes, and other editing to add additional elements such as decorations provided by the normal editing function. However, the present invention is not limited thereto, and the 3D editing function may be capable of accepting edits for adding additional elements.

For example, by additionally placing a 3D object corresponding to the trajectory of handwritten input by the user, such as a graffiti image (called a "graffiti object" hereinafter), in 3D space, an output image providing the same type of expression as a superimposed graffiti image can be obtained. The graffiti object is placed in the 3D space in correspondence with the camera defined for rendering the 3D space at the time of the handwritten input. More specifically, when handwritten input pertaining to a graffiti object is made, a 3D model is formed of a plate-shaped object having a plane orthogonal to the line of sight of the camera, the model having a 2D shape of the trajectory of the handwritten input in the direction of the line of sight of the camera. The graffiti object is then generated by applying an image of the trajectory of the handwritten input (corresponding to the graffiti image) as a texture to the plane orthogonal to the line of sight direction.

When the 3D space is rendered for the same camera, the graffiti object generated in this manner will appear in the output image in the same manner as if the graffiti image was superimposed, as indicated by 1401 in FIG. 14A. On the other hand, if an operation input for changing the camera is accepted in the 3D editing function, the surface to which the image of the trajectory of the handwritten input is applied is not directly facing the camera, and thus the graffiti object that is placed will have a different form, as indicated by 1402 in FIG. 14B.

Such decorative objects that embellish the output image are not limited to graffiti objects based on handwritten input. For example, stamps and the like employed in the editing functions of conventional photo sticker apparatuses may also be applied to plate-shaped objects such as graffiti objects and configured to be placeable in the 3D space as decorative objects. Of course, the decorative object is not limited to a plate-shaped object, and may have any 3D shape. The decorative object is not limited to an object drawn in the foreground of the subject, and may include an object constituting the background.

Additionally, for example, in a situation where a 3D object of a predetermined character, such as a celebrity or mascot, is stored in the storage apparatus 302 in advance, the object can be placed in the 3D space. Here, the parameters of the position, orientation, and scale in the 3D space may be set for a character object. In this case, the output image can be generated as if a subject 1403 and a character 1404 were photographed together, as illustrated in FIG. 14C.

Additionally, for example, it may be possible to place a light source object in the 3D space that adds a predetermined lighting effect or reflection effect, or an additional shading effect, to the image of the subject in the output image. Here, color, intensity, and type parameters may able to be set for the light source object. Although the editing functions employed in conventional photo sticker apparatuses include functions for changing the lighting of the subject in a virtual manner, doing so changes the overall brightness, tint, and the like, and thus the image of the subject may not appear natural in the output image. On the other hand, with the 3D editing function according to the present invention, the asperity of the subject is expressed in the 3D data of the subject, and thus more detailed lighting effects can be derived when desired light source objects are placed. In other words, an output image having a more natural finish can be obtained than with conventional editing functions which add lighting effects.

For example, the lighting effect is derived based on the type of the light source object and the distance between the light source object and each mesh in the 3D data. The reflection effect is derived based on the type of the light source object, the normal line of the surface of each mesh, and the placement relationship between the meshes, the light source object, and the camera. At this time, in a situation where the parameters of the reflection characteristics (material information and the like) are set for each part of the subject, the 3D data of the subject may be referred to for deriving the reflection effect. The shading effect is derived based on the front-back relationship of each mesh in the direction in which the light source object emits light.

Although the addition of objects to the 3D space is described as being performed in the editing part, the present invention is not limited thereto. For example, in order to obtain an output image with a character object added in a suitable manner, it is necessary to shoot the subject under the assumption that the object will be added. For this reason, an image in a state where the object to be added is placed may be displayed in the first display apparatus 340 in the photographing part, which enables the subject to adjust his/her pose and so on to obtain an output image having the desired finish.

More specifically, based on an operation input for adding an object made by the user, the first image processing unit 306 generates an object image by placing and rendering the corresponding object in the 3D space in a set position and orientation. At this time, each pixel in the object image is assumed to be associated with information on the distance between the camera and the position where the mesh corresponding to each pixel is located in the 3D space. Then, based on the asperity information pertaining to the captured image output from the image capturing apparatus 320, the first image processing unit 306 composites the object image with the captured image, and the first presentation control unit 307 displays the image obtained from the composition in the first display apparatus 340. During the composition, a shielding relationship is expressed by comparing the distance information pertaining to each pixel in the object image with the asperity information. In other words, if the object to be added is closer to the image capturing apparatus 320 than the subject, the pixels of the object image will appear in the composite image. If the object to be added is farther away from the image capturing apparatus 320 than the subject, the compositing processing is performed such that the pixels of the captured image appear in the composite image.

Although this variation describes the 3D data of the subject as not being generated in the generation of the image to which objects are added in the photographing part in order to reduce the computational load, the present invention is not limited thereto. In other words, it goes without saying that the configuration may be such that, as in the editing part, the image generated by the rendering of the 3D data of the subject in the 3D editing function is displayed in the first display apparatus 340 in the photographing part. Such a display can be used, for example, to introduce recommended poses for the next shot taken in the photographing part. In other words, 3D data of the subject is generated based on the shot image and the asperity information obtained from a previous shot, and the image generated by changing the form thereof is displayed in the first display apparatus 340 in the photographing part.

Seventh Variation

Although the foregoing embodiments and variations described the output image generated using 3D data of a subject based on a captured image and asperity information as being output by being displayed in a display apparatus or printed onto a print medium, the present invention is not limited thereto. The image may be output, for example, by transmitting data of the output image to an external apparatus such as a mobile terminal used by the user or a server providing a data download service. Alternatively, the image may be output by recording data of the output image onto a predetermined recording medium.

In addition, the output by the photo sticker apparatus 100 may further include the 3D data of the subject. In a situation where the 3D data of the subject is provided, for example, a 3D editing function using the 3D data or a viewing function can also be provided through a corresponding application used by the user on a mobile terminal or the like. Alternatively, the 3D data of the subject may be used as an avatar or the like of the user in a predetermined Social Networking Service (SNS).

Additionally, in a situation where the 3D data of the subject is output, it is not absolutely necessary to output the output image generated through the 3D editing function using the 3D data. For example, when the photo sticker apparatus 100 is used to create an avatar, it is sufficient to output only the 3D data of the subject, instead of the output image.

Eighth Variation

Although the foregoing embodiments and variations described the output image generated using the 3D data of the subject in the photo sticker apparatus 100 as being a still image, the present invention is not limited thereto. The output image may include moving images. The moving image may be constituted by frames of images rendered while sequentially moving the camera in a 3D space in which the 3D data of the subject is arranged, for example, and then combining those frames. The moving image may also be generated by shooting a moving image in the photographing part and applying the results of the 3D editing function performed on any frame of the moving image in the editing part to other frames.

The moving image may be provided to the user by, for example, transmitting the data of the moving images to a mobile terminal used by the user, or by adding link information for viewing the moving image to the sticker paper on which the output image is printed and output.

Ninth Variation

Although the foregoing embodiments and variations described the asperity information obtained by the image capturing apparatus 320 as being a depth image indicating the subject distance for each pixel of the corresponding captured image, the present invention is not limited thereto. The asperity information may be information from which the shape of the subject can be derived, such as a pair of images having parallax (the first image signal and the second image signal), or may be configured as a 3D model of the shape of the subject. In other words, it goes without saying that the asperity information can be in any format as long as it is information from which the shape of the subject can be derived when generating the 3D data of the subject. Accordingly, the image capturing apparatus 320 is not limited an apparatus having an image sensor capable of measuring distance using the imaging plane phase-difference detection rangefinding method, and may also be, for example, a stereo camera or a set of an image capturing apparatus and a projector that measures distance using the Time of Flight (ToF) method.

Tenth Variation

Although the foregoing embodiments and variations describe situations where the image processing system is the photo sticker apparatus 100 and the subject is a person, the present invention is not limited thereto. The subject can include any desired object other than a person, such as a dog, cat, or other animal, a bag or other decorative item, a stuffed animal, or the like.

Eleventh Variation

The foregoing embodiments and variations described the image processing unit 405 of the image capturing apparatus 320 as generating the asperity information, and the second image processing unit 308 of the photo sticker apparatus 100 as using the asperity information to generate the 3D data of the subject. However, the present invention is not limited thereto, and at least some of the processing performed by each apparatus in the image processing system may be implemented by different apparatuses.

In particular, processing that can have a high computational load, such as the generation of the asperity information and the 3D data based on the asperity information, may be implemented in such a way that the processing is executed by an external computation server or the like communicatively connected to the photo sticker apparatus 100 and the results of the processing are obtained from the server. Other processing such as rendering the 3D data and adding effects during rendering may similarly be executed by an external computation server or the like.

In this situation, providing the data of the output image generated using the 3D data, providing the 3D data, and so on to the user can be performed by the external computation server, without going through the photo sticker apparatus 100. Furthermore, it goes without saying that at least some of the calculations for providing the 3D editing function, the viewing function, and the like in a mobile terminal or the like used by the user, as in the seventh variation, may be performed by this computation server or another apparatus providing equivalent functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-110590, filed Jul. 8, 2022, which is hereby incorporated by reference herein in its entirety.

What is claimed is:

1. An image processing apparatus that generates an image pertaining to a subject, the image processing apparatus comprising:
at least one processor and/or circuit configured to function as a plurality of units comprising:
(1) an obtainment unit configured to obtain a captured image and asperity information of the subject;
(2) a first generation unit configured to generate 3D data of the subject based on the captured image and the asperity information obtained by the obtainment unit;
(3) an instruction unit configured to make a change instruction to change a form of the 3D data generated by the first generation unit;
(4) a second generation unit configured to generate, as the image pertaining to the subject, an image corresponding to the 3D data changed based on the change instruction, wherein the second generation unit renders a 3D space in which the 3D data after the change is placed; and
(5) a placement unit configured to place an object in the 3D space,
wherein the second generation unit generates the image pertaining to the subject by rendering the 3D space in which the 3D data after the change and the object are placed.

2. The image processing apparatus according to claim 1, wherein the change to the form of the 3D data based on the change instruction includes a change to an orientation of at least part of the 3D data.

3. The image processing apparatus according to claim 2, wherein the subject is a person, and
wherein the change to the form of the 3D data based on the change instruction is a change to an orientation of at least one of an eyeball part or a head of the 3D data.

4. The image processing apparatus according to claim 3, wherein the change to the form of the 3D data based on the change instruction is a change to the orientation of the eyeball part of the 3D data according to a viewpoint during rendering by the second generation unit.

5. The image processing apparatus according to claim 1, wherein in the change to the form of the 3D data based on the change instruction, a range that can be changed is limited based on the captured image and the asperity information used to generate the 3D data.

6. The image processing apparatus according to claim 1, wherein the subject is a person, and
wherein the change to the form of the 3D data based on the change instruction includes a change to a texture applied to an eyeball part of the 3D data.

7. The image processing apparatus according to claim 6, wherein the change to the form of the 3D data based on the change instruction is a change to a texture applied to the eyeball part of the 3D data according to a viewpoint during rendering by the second generation unit.

8. The image processing apparatus according to claim 1, wherein the change to the form of the 3D data based on the change instruction includes a change to a shape of the 3D data.

9. The image processing apparatus according to claim 8, wherein the change to the shape of the 3D data includes a change that stretches or shrinks a part of the 3D data in a predetermined direction.

10. The image processing apparatus according to claim 1, wherein the change to the form of the 3D data based on the change instruction includes a change to a direction in which the 3D data is rendered by the second generation unit.

11. The image processing apparatus according to claim 1, wherein the instruction unit makes the change instruction in response to an operation input pertaining to a change to the form of the 3D data being received.

12. The image processing apparatus according to claim 11, wherein when an operation input pertaining to a change to the form of the 3D data is not received, the second generation unit generates an image pertaining to the subject based on a captured image of the subject, without rendering the 3D data.

13. The image processing apparatus according to claim 1, wherein the object includes at least one of an object of a predetermined character, a decorative object, or a light source object.

14. The image processing apparatus according to claim 1, wherein the at least one processor and/or circuit is further configured to function as an output unit configured to output the image pertaining to the subject generated by the second generation unit.

15. The image processing apparatus according to claim 14, wherein the output unit includes a unit configured to display the image pertaining to the subject.

16. The image processing apparatus according to claim 14, wherein the output unit includes a unit configured to record data of the image pertaining to the subject into a recording medium.

17. The image processing apparatus according to claim 14, wherein the output unit includes a unit configured to print the image pertaining to the subject onto a print medium.

18. The image processing apparatus according to claim 14, wherein the output unit includes a unit configured to transmit data of the image pertaining to the subject to an external apparatus.

19. The image processing apparatus according to claim 14, wherein the output unit further outputs the 3D data.

20. The image processing apparatus according to claim 14, wherein the output unit outputs the 3D data instead of the image pertaining to the subject.

21. The image processing apparatus according to claim 1, wherein the image pertaining to the subject is at least one of a still image or a moving image.

22. A computer-readable recording medium having stored therein a program for causing a computer to function as the image processing apparatus according to claim 1.

23. An image processing method for generating an image pertaining to a subject, the image processing method comprising:
obtaining a captured image and asperity information of the subject;
generating 3D data of the subject based on the captured image and the asperity information obtained;
making a change instruction to change a form of the 3D data generated;
generating, as the image pertaining to the subject, an image corresponding to the 3D data changed based on the change instruction, wherein in the generating, a 3D space, in which the 3D data after the change is placed, is rendered; and
placing an object in the 3D space,
wherein in the generating, the image pertaining to the subject by rendering the 3D space in which the 3D data after the change is generated, and the object are placed.

24. An image processing system comprising (1) an image capturing apparatus and (2) an image processing apparatus that generates an image of a subject from the image capturing apparatus,
- wherein the image capturing apparatus includes: (1) an image capturing unit configured to obtain a captured image of the subject; and (2) a measurement unit configured to obtain asperity information of the subject, and
- wherein the image processing apparatus includes at least one processor and/or circuit configured to function as a plurality of units comprising:
- (1) an obtainment unit configured to obtain the captured image and the asperity information of the subject from the image capturing apparatus;
- (2) a first generation unit configured to generate 3D data of the subject based on the captured image and the asperity information obtained by the obtainment unit;
- (3) an instruction unit configured to make a change instruction to change a form of the 3D data generated by the first generation unit;
- (4) a second generation unit configured to generate, as the image pertaining to the subject, an image corresponding to the 3D data changed based on the change instruction, wherein the second generation unit renders a 3D space in which the 3D data after the change is placed; and
- (5) a placement unit configured to place an object in the 3D space,
- wherein the second generation unit generates the image pertaining to the subject by rendering the 3D space in which the 3D data after the change and the object are placed.

25. The image processing system according to claim 24, wherein the image capturing unit is an image sensor capable of separately capturing light beams passing through respective pupil regions of an optical imaging system, and
- wherein the measurement unit derives distance information to the subject based on a set of the captured images pertaining to the light beams passing through the respective pupil regions, and obtains the asperity information of the subject based on the distance information.

26. An image processing apparatus that generates an image pertaining to a subject, the image processing apparatus comprising:
- at least one processor and/or circuit configured to function as a plurality of units comprising:
- (1) an obtainment unit configured to obtain a captured image and asperity information of the subject;
- (2) a first generation unit configured to generate 3D data of the subject based on the captured image and the asperity information obtained by the obtainment unit;
- (3) an instruction unit configured to make a change instruction to change a form of the 3D data generated by the first generation unit; and
- (4) a second generation unit configured to generate, as the image pertaining to the subject, an image corresponding to the 3D data changed based on the change instruction,
- wherein in the change to the form of the 3D data based on the change instruction, a range that can be changed is limited based on the captured image and the asperity information used to generate the 3D data.

27. An image processing system comprising (1) an image capturing apparatus and (2) an image processing apparatus that generates an image of a subject from the image capturing apparatus,
- wherein the image capturing apparatus includes: (1) an image capturing unit configured to obtain a captured image of the subject; and (2) a measurement unit configured to obtain asperity information of the subject, and
- wherein the image processing apparatus includes at least one processor and/or circuit configured to function as a plurality of units comprising:
- (1) an obtainment unit configured to obtain the captured image and the asperity information of the subject from the image capturing apparatus;
- (2) a first generation unit configured to generate 3D data of the subject based on the captured image and the asperity information obtained by the obtainment unit;
- (3) an instruction unit configured to make a change instruction to change a form of the 3D data generated by the first generation unit; and
- (4) a second generation unit configured to generate, as the image pertaining to the subject, an image corresponding to the 3D data changed based on the change instruction,
- wherein the image capturing unit is an image sensor capable of separately capturing light beams passing through respective pupil regions of an optical imaging system, and
- wherein the measurement unit derives distance information to the subject based on a set of the captured images pertaining to the light beams passing through the respective pupil regions, and obtains the asperity information of the subject based on the distance information.

* * * * *